(12) United States Patent
Zhou et al.

(10) Patent No.: US 10,848,222 B2
(45) Date of Patent: Nov. 24, 2020

(54) SYNCHRONIZING TIMING FOR UPDATING BEAM CONFIGURATION INFORMATION

(71) Applicant: QUALCOMM Incorporated, San Diego, CA (US)

(72) Inventors: Yan Zhou, San Diego, CA (US); Tao Luo, San Diego, CA (US); Ruhua He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/584,735

(22) Filed: Sep. 26, 2019

(65) Prior Publication Data

US 2020/0106498 A1 Apr. 2, 2020

Related U.S. Application Data

(60) Provisional application No. 62/739,127, filed on Sep. 28, 2018.

(51) Int. Cl.
*H04B 7/06* (2006.01)
*H04W 16/28* (2009.01)

(52) U.S. Cl.
CPC ......... *H04B 7/0617* (2013.01); *H04B 7/0619* (2013.01); *H04W 16/28* (2013.01)

(58) Field of Classification Search
CPC .. H04B 7/0617; H04B 7/0619; H04B 7/0695; H04W 16/28
See application file for complete search history.

(56) References Cited

U.S. PATENT DOCUMENTS 9,804,824 B1 * 10/2017 Ning .................. G06F 5/12
2007/0245204 A1 * 10/2007 Yomo ................. H04L 1/188
714/749

(Continued)

FOREIGN PATENT DOCUMENTS

WO WO 2019/032997 2/2019

OTHER PUBLICATIONS

International Search Report and Written Opinion—PCT/US2019/053522—ISA/EPO—dated Dec. 17, 2019.

(Continued)

*Primary Examiner* — Jean B Corrielus
(74) *Attorney, Agent, or Firm* — Holland & Hart LLP/Qualcomm Inc.; Nerrie M. Zohn

(57) ABSTRACT

Techniques for identifying events for updating beam configurations for wireless communications employing beamforming are described. The events may be based on a response message to an aperiodic reference signal (RS). For example, a device that receives an aperiodic RS may transmit a message to the device that transmitted the aperiodic RS to confirm that the aperiodic RS was received. Additionally or alternatively, a device that receives an aperiodic RS may set a timer after receiving the aperiodic RS (or transmission of the confirmation message), and may update its beam configuration upon expiration of the timer. If control information is received to schedule a second aperiodic RS prior to expiration of a timer for a first periodic RS, a device may update the timer. Updating the timer for aperiodic RS may be individual to different aperiodic RS transmissions, or may be common among aperiodic RS.

58 Claims, 12 Drawing Sheets

(56) References Cited

U.S. PATENT DOCUMENTS

| | | | |
|---|---|---|---|
| 2017/0156176 A1* | 6/2017 | Bergquist | H04W 8/22 |
| 2018/0199185 A1* | 7/2018 | Tenny | H04W 8/22 |
| 2018/0219606 A1 | 8/2018 | Ng et al. | |
| 2019/0081675 A1 | 3/2019 | Jung et al. | |
| 2019/0158162 A1* | 5/2019 | Ryu | H04B 7/0639 |
| 2019/0190582 A1 | 6/2019 | Guo et al. | |
| 2020/0028655 A1* | 1/2020 | Kakishima | H04L 5/0073 |
| 2020/0100295 A1* | 3/2020 | Pao | H04W 56/001 |

OTHER PUBLICATIONS

Samsung: "On Beam Indication", 3GPP Draft, R1-1717627 on Beam Indication_V1, 3RD Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13, 2017, Oct. 8, 2017 (Oct. 8, 2017), XP051340813, 9 Pages, Retrieved from the Internet: URL:http://www.3gpp.org/ftp/Meetings_3GPP_SYNC/RAN1/Docs/[retrieved on Oct. 8, 2017].

* cited by examiner

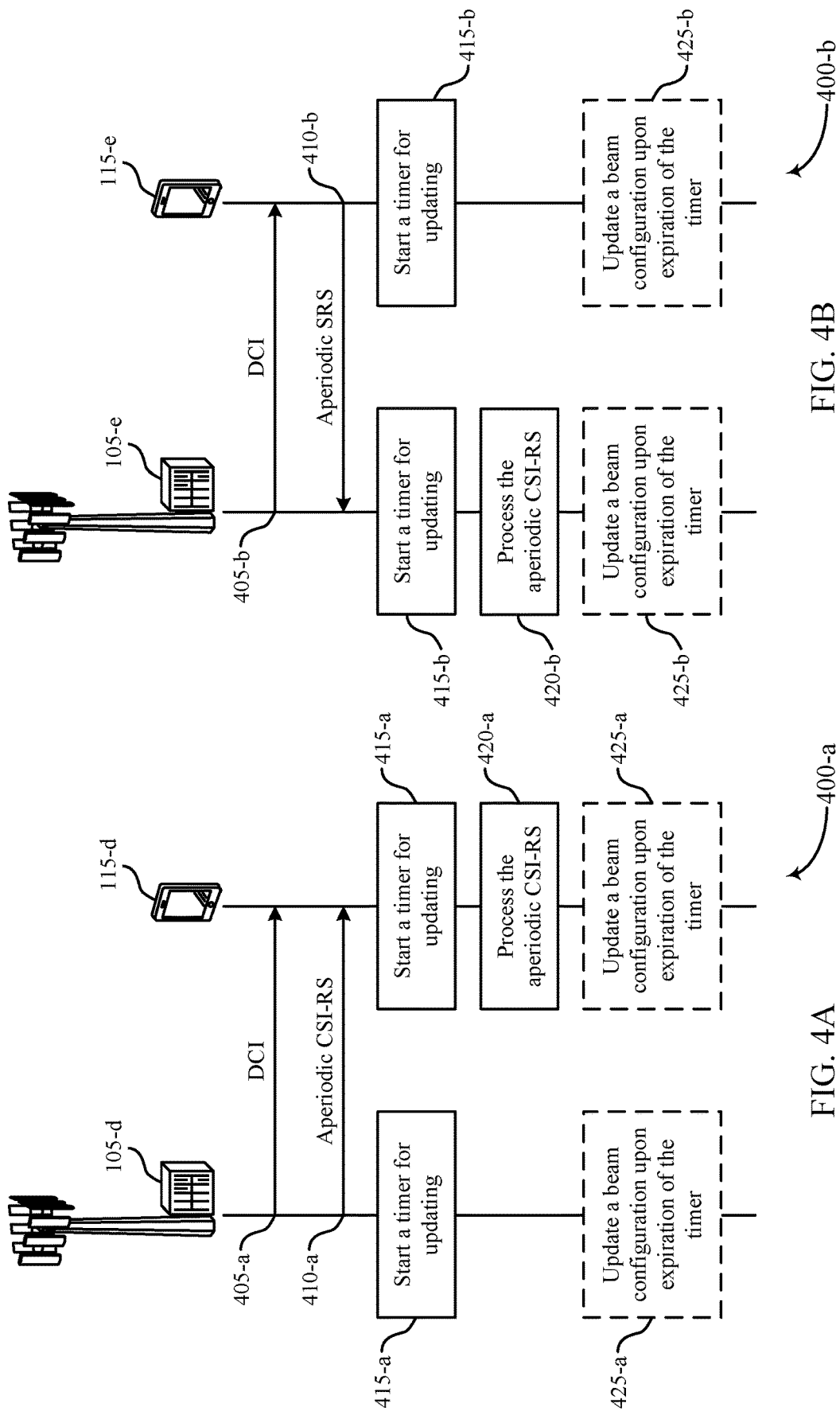

SYNCHRONIZING TIMING FOR UPDATING BEAM CONFIGURATION INFORMATION

CROSS REFERENCE

The present Application for Patent claims the benefit of U.S. Provisional Patent Application No. 62/739,127 by ZHOU et al., entitled "SYNCHRONIZING TIMING FOR UPDATING BEAM CONFIGURATION INFORMATION," filed Sep. 28, 2018, assigned to the assignee hereof, and expressly incorporated by reference herein in its entirety.

BACKGROUND

The following relates generally to wireless communications, and more specifically to synchronizing timing for updating beam configuration information.

Wireless communications systems are widely deployed to provide various types of communications content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code-division multiple access (CDMA), time-division multiple access (TDMA), frequency-division multiple access (FDMA), orthogonal frequency-division multiple access (OFDMA), or discrete Fourier transform-spread-orthogonal frequency-division multiplexing (DFT-s-OFDM). A wireless multiple-access communications system may include a number of base stations or network access nodes, each simultaneously supporting communication between multiple communications devices, which may be otherwise known as user equipment (UE).

Wireless communications systems may use various configurations to support wireless transmissions/receptions. For example, beam configurations may be used to select or otherwise identify various parameters to be used for wireless communications employing beamforming (e.g., millimeter wave (mmW) communications). Beam configurations may include spatial relation information for uplink resources or quasi-colocated (QCL) information for downlink resources. Beam configurations may include, for example, beam direction, beam identifier, spatial stream, and the like. Beam configurations may include transmit beam configurations and receive beam configurations, and the transmitters and receivers may update beam configurations in response to changes in channel conditions. However, changes to beam configurations may impact ongoing communications. For example, the use of an updated beam configuration in one device without a corresponding update in a second device may result in a loss of communication, an increase in latency, a decrease in reliability, and the like.

SUMMARY

The described techniques relate to improved methods, systems, devices, and apparatuses that support synchronizing timing for updating beam configuration information. Generally, the described techniques provide for identifying events for updating beam configurations for wireless communications employing beamforming. An update to a beam configuration may be initiated based on an aperiodic reference signal (RS), and synchronization across devices for updating the beam configuration may be based on the aperiodic RS or a response message to the aperiodic RS. For example, a device that receives an aperiodic RS may transmit a message to the device that transmitted the aperiodic RS to confirm that the aperiodic RS was received. Additionally or alternatively, a device that receives an aperiodic RS may set a timer after receiving the aperiodic RS (or transmission of the confirmation message) and may update its beam configuration after expiration of the timer. If control information is received to schedule a second aperiodic RS prior to expiration of a timer for a first periodic RS (e.g., when a response message is not received at the transmitter of the first periodic RS), a device may update the timer. Updating the timer for aperiodic RS may be performed individually for different aperiodic RS transmissions (e.g., associated with different beams) or may be performed commonly among aperiodic RS transmissions (e.g., a common action time for each beam configuration).

A method of wireless communications is described. The method may include transmitting, from a first device to a second device configured to use a first beam configuration for communicating between the first device and the second device, a first aperiodic RS associated with a second beam configuration for communicating between the first device and the second device, monitoring for at least one of an expiration of a timer associated with an update to the second beam configuration or a confirmation message from the second device indicating that the first aperiodic RS was received at the second device, and communicating with the second device according to the second beam configuration based on the monitoring.

An apparatus for wireless communications is described. The apparatus may include a processor, memory in electronic communication with the processor, and instructions stored in the memory. The instructions may be executable by the processor to cause the apparatus to transmit, from a first device to a second device configured to use a first beam configuration for communicating between the first device and the second device, a first aperiodic RS associated with a second beam configuration for communicating between the first device and the second device, monitor for at least one of an expiration of a timer associated with an update to the second beam configuration or a confirmation message from the second device indicating that the first aperiodic RS was received at the second device, and communicate with the second device according to the second beam configuration based on the monitoring.

Another apparatus for wireless communications is described. The apparatus may include means for transmitting, from a first device to a second device configured to use a first beam configuration for communicating between the first device and the second device, a first aperiodic RS associated with a second beam configuration for communicating between the first device and the second device, monitoring for at least one of an expiration of a timer associated with an update to the second beam configuration or a confirmation message from the second device indicating that the first aperiodic RS was received at the second device, and communicating with the second device according to the second beam configuration based on the monitoring.

A non-transitory computer-readable medium storing code for wireless communications is described. The code may include instructions executable by a processor to transmit, from a first device to a second device configured to use a first beam configuration for communicating between the first device and the second device, a first aperiodic RS associated with a second beam configuration for communicating between the first device and the second device, monitor for at least one of an expiration of a timer associated with an update to the second beam configuration or a confirmation message from the second device indicating that the first aperiodic RS was received at the second device, and communicate with the second device according to the second beam configuration based on the monitoring.

Some examples of the method, apparatuses, and non-transitory computer-readable medium described herein may further include operations, features, means, or instructions for identifying an expiration time of the timer and transmitting a second aperiodic RS to the second device prior to the expiration time of the timer based on failing to receive, from the second device, the confirmation message that the first aperiodic RS was received at the second device. In some examples of the method, apparatuses, and non-transitory computer-readable medium described herein, the communicating with the second device according to the second beam configuration occurs after the expiration of the timer.

Some examples of the method, apparatuses, and non-transitory computer-readable medium described herein may further include operations, features, means, or instructions for communicating with the second device according to the first beam configuration prior to the expiration of the timer or receiving the confirmation message.

Some examples of the method, apparatuses, and non-transitory computer-readable medium described herein may further include operations, features, means, or instructions for receiving the confirmation message from the second device indicating that the first aperiodic RS was received at the second device and starting the timer after an end of receiving the confirmation message. Some examples of the method, apparatuses, and non-transitory computer-readable medium described herein may further include operations, features, means, or instructions for starting the timer after an end of transmitting the first aperiodic RS.

Some examples of the method, apparatuses, and non-transitory computer-readable medium described herein may further include operations, features, means, or instructions for transmitting, to the second device, a downlink control information (DCI) message including scheduling information associated with the first aperiodic RS. In some examples of the method, apparatuses, and non-transitory computer-readable medium described herein, the scheduling information may include a start time for a transmission opportunity for the first aperiodic RS, an end time for the transmission opportunity for the first aperiodic RS, a duration for the timer, or a combination. Some examples of the method, apparatuses, and non-transitory computer-readable medium described herein may further include operations, features, means, or instructions for starting the timer after an end of transmitting the DCI message.

In some examples of the method, apparatuses, and non-transitory computer-readable medium described herein, the first beam configuration includes first spatial relation information associated with a first uplink transmit beam at the first device or the second device and a first uplink receive beam at the second device or the first device. In some examples of the method, apparatuses, and non-transitory computer-readable medium described herein, the second beam configuration includes second spatial relation information associated with a second uplink transmit beam at the first device or the second device and a second uplink receive beam at the second device or the first device. In some examples of the method, apparatuses, and non-transitory computer-readable medium described herein, the first and second uplink transmit beams may be associated with a common set of beam parameters.

In some examples of the method, apparatuses, and non-transitory computer-readable medium described herein, the first beam configuration includes first quasi-colocated (QCL) information associated with a first downlink transmit beam at the first device or the second device and a first downlink receive beam at the second device or the first device. In some examples of the method, apparatuses, and non-transitory computer-readable medium described herein, the second beam configuration includes second QCL information associated with a second downlink transmit beam at the first device or the second device and a second downlink receive beam at the second device or the first device. In some examples of the method, apparatuses, and non-transitory computer-readable medium described herein, the first and second downlink transmit beams may be associated with a common set of beam parameters.

Some examples of the method, apparatuses, and non-transitory computer-readable medium described herein may further include operations, features, means, or instructions for identifying a value for the timer based on a predetermined value for the timer or an indication of the value for the timer received from the second device.

In some examples of the method, apparatuses, and non-transitory computer-readable medium described herein, the confirmation message includes a channel state feedback report, an acknowledgement/negative-acknowledgement message, or a buffer status report.

In some examples of the method, apparatuses, and non-transitory computer-readable medium described herein, the first aperiodic RS includes an aperiodic channel state information reference signal or a sounding reference signal.

A method of wireless communications is described. The method may include receiving, at a first device configured to use a first beam configuration for communicating between the first device and a second device, a first aperiodic RS associated with a second beam configuration for communicating between the first device and the second device, identifying an event for updating to the second beam configuration, and communicating with the second device according to the second beam configuration based on the identifying.

An apparatus for wireless communications is described. The apparatus may include a processor, memory in electronic communication with the processor, and instructions stored in the memory. The instructions may be executable by the processor to cause the apparatus to receive, at a first device configured to use a first beam configuration for communicating between the first device and a second device, a first aperiodic RS associated with a second beam configuration for communicating between the first device and the second device, identify an event for updating to the second beam configuration, and communicate with the second device according to the second beam configuration based on the identifying.

Another apparatus for wireless communications is described. The apparatus may include means for receiving, at a first device configured to use a first beam configuration for communicating between the first device and a second device, a first aperiodic RS associated with a second beam configuration for communicating between the first device and the second device, identifying an event for updating to the second beam configuration, and communicating with the second device according to the second beam configuration based on the identifying.

A non-transitory computer-readable medium storing code for wireless communications is described. The code may include instructions executable by a processor to receive, at a first device configured to use a first beam configuration for communicating between the first device and a second device, a first aperiodic RS associated with a second beam configuration for communicating between the first device and the second device, identify an event for updating to the second beam configuration, and communicate with the second device according to the second beam configuration based on the identifying.

In some examples of the method, apparatuses, and non-transitory computer-readable medium described herein, identifying the event for updating to the second beam configuration may include operations, features, means, or instructions for starting a timer after an end of receiving the first aperiodic RS or after an end of transmitting a confirmation message in response to receiving the first aperiodic RS. Some examples of the method, apparatuses, and non-transitory computer-readable medium described herein may further include operations, features, means, or instructions for identifying an expiration of the timer, where the communicating with the second device according to the second beam configuration occurs after the expiration of the timer. Some examples of the method, apparatuses, and non-transitory computer-readable medium described herein may further include operations, features, means, or instructions for identifying a value for the timer based on a predetermined value for the timer or an indication of the value for the timer received from the second device.

In some examples of the method, apparatuses, and non-transitory computer-readable medium described herein, identifying the event for updating to the second beam configuration may include operations, features, means, or instructions for receiving, prior to the expiration time of the timer, control information from the second device scheduling a second aperiodic RS and resetting the timer after an end of receiving the second aperiodic RS or after an end of transmitting a second confirmation message in response to receiving the second aperiodic RS.

In some examples of the method, apparatuses, and non-transitory computer-readable medium described herein, the first aperiodic RS may be associated with a first set of resources and the second aperiodic RS may be associated with a second set of resources.

In some examples of the method, apparatuses, and non-transitory computer-readable medium described herein, the first set of resources and the second set of resources may be a common set of resources. In some examples of the method, apparatuses, and non-transitory computer-readable medium described herein, the second set of resources may be different from the first set of resources. In some examples of the method, apparatuses, and non-transitory computer-readable medium described herein, the first set of resources includes an uplink control channel, an uplink data channel, a downlink control channel, a downlink data channel, a bandwidth part, a sub-band, a set of time-resources, or a combination thereof.

Some examples of the method, apparatuses, and non-transitory computer-readable medium described herein may further include operations, features, means, or instructions for communicating with the second device according to the first beam configuration prior to the event for updating to the second beam configuration.

In some examples of the method, apparatuses, and non-transitory computer-readable medium described herein, identifying the event for updating to the second beam configuration may include operations, features, means, or instructions for transmitting a confirmation message to the second device indicating that the first aperiodic RS was received at the first device. In some examples of the method, apparatuses, and non-transitory computer-readable medium described herein, identifying the event for updating to the second beam configuration may include operations, features, means, or instructions for starting a timer after an end of transmitting the confirmation message and identifying an expiration of the timer. In some examples of the method, apparatuses, and non-transitory computer-readable medium described herein, the confirmation message includes a channel state feedback report, an acknowledgement/negative-acknowledgement message, or a buffer status report.

Some examples of the method, apparatuses, and non-transitory computer-readable medium described herein may further include operations, features, means, or instructions for transmitting, to the second device, a DCI message including scheduling information associated with the first aperiodic RS. In some examples of the method, apparatuses, and non-transitory computer-readable medium described herein, the scheduling information may include a start time for a transmission opportunity for the first aperiodic RS, an end time for the transmission opportunity for the first aperiodic RS, a duration for the timer, or a combination. Some examples of the method, apparatuses, and non-transitory computer-readable medium described herein may further include operations, features, means, or instructions for starting the timer after an end of transmitting the DCI message.

In some examples of the method, apparatuses, and non-transitory computer-readable medium described herein, the first beam configuration includes first spatial relation information associated with a first uplink transmit beam at the second device or the first device and a first uplink receive beam at the first device or the second device and the second beam configuration includes second spatial relation information associated with a second uplink transmit beam at the second device or the first device and a second uplink receive beam at the first device or the second device.

In other examples of the method, apparatuses, and non-transitory computer-readable medium described herein, the first beam configuration includes first QCL information associated with a first downlink transmit beam at the second device or the first device and a first downlink receive beam at the first device or the second device and the second beam configuration includes second QCL information associated with a second downlink transmit beam at the second device or the first device and a second downlink receive beam at the first device or the second device.

In some examples of the method, apparatuses, and non-transitory computer-readable medium described herein, the first aperiodic RS includes an aperiodic channel state information reference signal or a sounding reference signal.

BRIEF DESCRIPTION OF THE DRAWINGS

FIGS. 3A, 3B, 4A, 4B, and 5 illustrate examples of process flows that support synchronizing timing for updating beam configuration information in accordance with aspects of the present disclosure.

DETAILED DESCRIPTION

Figure 1:
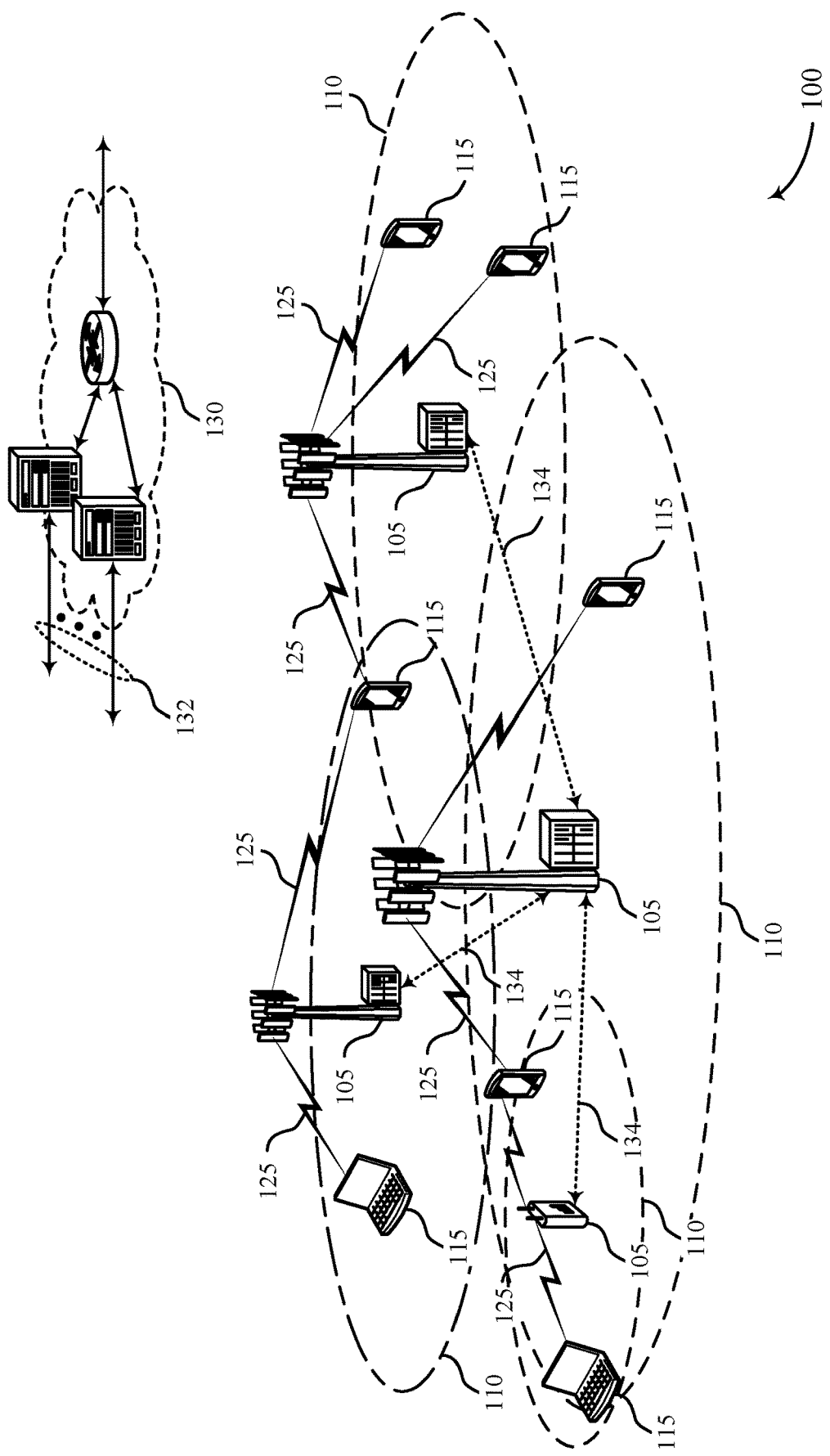
FIG. 1 illustrates an example of a wireless communications system that supports synchronizing timing for updating beam configuration information in accordance with aspects of the present disclosure.

Wireless communications employing beamforming (e.g., millimeter wave (mmW) communications) may use beam configurations to support links between devices. Beam configurations may include transmit beam configurations and receive beam configurations, and the transmitters and receivers may update beam configurations in response to changes in channel conditions. Beam configurations may include spatial relation information for uplink resources, or quasi-colocated (QCL) information for downlink resources. Reference signals (RSs) transmitted between devices may be used to update beam configurations, and the devices may use channel reciprocity to update transmit beam configurations based on a receive beam configuration determined for an RS. For example, a user equipment (UE) may receive a channel state information RS (CSI-RS) and determine a downlink receive beam for receiving the CSI-RS. The UE may transmit an uplink sounding RS (SRS) based on the determined downlink receive beam (e.g., the uplink SRS having the same spatial relation as the determined downlink receive beam). In addition, RSs sent over one channel may be used to update the beam configuration for a different channel. For example, a base station may transmit a CSI-RS to update QCL information for other downlink resources (e.g., different time resources, different frequency resources, or a different channel such as a physical downlink control channel (PDCCH) or physical downlink shared channel (PDSCH)).

However, if a transmitter and receiver update beam configurations differently (e.g., asynchronously), a change in beam configuration at one device may result in loss of communication and may increase latency or force beam recovery. In particular, if a control channel transmission (e.g., downlink control information (DCI)) associated with an RS is missed by a UE, the base station may update a beam configuration while the UE may not receive the RS and instead continue to operate with the stale beam configuration. In addition, some devices may have processing requirements related to updating beam configurations based on RSs, which may lead to asynchronous beam configuration updates by the UE and base station. For example, a UE may have a processing time to update a spatial relation after receiving a CSI-RS prior to transmitting an SRS or an uplink channel (e.g., a physical uplink control channel (PUCCH) or physical uplink shared channel (PUSCH)). In addition, a base station may require processing time after receiving an SRS to update receive components to an updated beam configuration for PUCCH or PUSCH. If a UE changes an uplink transmit beam (e.g., for PUCCH or PUSCH) before the base station updates its receive components for the updated receive beam, the base station may not correctly receive the transmission.

Aspects of the disclosure are directed to synchronizing procedures for updated beam configurations at components of a wireless system such as UEs or base stations. According to various aspects, base stations or UEs may be configured to identify events for updating beam configurations, where the events may be based on a response message to an aperiodic RS, a timer for updating beam configurations, or combinations of a response message and the timer. For example, a device that receives an aperiodic RS may transmit a message to the device that transmitted the aperiodic RS to confirm that the aperiodic RS was received. The message may be, for example, a channel state feedback report, an acknowledgment/negative-acknowledgement (ACK/NACK), or a buffer status report. Additionally or alternatively, a device that receives an aperiodic RS may set a timer upon or after receiving the aperiodic RS (or transmission of the confirmation message), and the device may update its beam configuration upon expiration of the timer. The timer may be, for example, a number of symbols, a number of slots, or a fixed duration (e.g., in milliseconds (ms)). The timer value may be predetermined, or may be based on device capability, and may be signaled or configured for the device. Timer values may be different for different types of aperiodic RS signals (e.g., CSI-RS or SRS). If control information is received to schedule a second aperiodic RS prior to expiration of a timer for a first aperiodic RS, a device may update the timer (e.g., reset the timer). Updating the timer for aperiodic RS may be individual to different aperiodic RS transmissions (e.g., CSI-RS, SRS, different frequency or time resources), or may be common among aperiodic RS (e.g., receiving control information scheduling any aperiodic RS may update a common timer for updating beam configurations).

Aspects of the disclosure are initially described in the context of wireless communications systems. Additional aspects are described with respect to process flows. Aspects of the disclosure are further illustrated by and described with reference to apparatus diagrams, system diagrams, and flowcharts that relate to synchronizing timing for updating beam configuration information.

FIG. 1 illustrates an example of a wireless communications system 100 that supports synchronizing timing for updating beam configuration information in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communications entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency-division duplexing (FDD), time-division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, RSs, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, RSs, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be colocated at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30{,}720{,}000$ seconds. Time intervals of a communications resource may be organized according to radio frames each having a duration of 10 milliseconds (ms), where the frame period may be expressed as $T_f = 307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., Evolved Universal Terrestrial Radio Access (E-UTRA)) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency-division multiplexing (OFDM) or discrete Fourier transform-spread-OFDM (DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time-division multiplexing (TDM) techniques, frequency-division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Some systems may implement aperiodic RS transmissions to update beam configurations (e.g., spatial relations or QCL information) without synchronizing the beam configuration updates between devices. This may result in missed transmissions based on unsynchronized beam updates. In a first example, if a UE fails to detect or otherwise successfully receive DCI scheduling for an aperiodic RS transmission, the UE may not monitor for an aperiodic RS transmission. If the base station transmitting the aperiodic RS updates a beam configuration based on this aperiodic RS, the UE may not identify the beam configuration update and accordingly may transmit or receive according to a different configuration. This mismatch of beam configuration updates may result in inefficient communication between the base station and UE. Similar issues may arise if either the base station or UE fails to successfully receive an aperiodic RS, but the device transmitting the aperiodic RS updates anyway.

Furthermore, a wireless device receiving an aperiodic RS requires a certain processing time to update the beam configuration before using this updated beam configuration for communication. If the wireless device transmitting the aperiodic RS updates the beam configuration prior to the completion of this processing timeline, the wireless devices may communicate using different beam configurations for a period of time, resulting in missed transmissions and inefficient communication. For example, a UE may receive an aperiodic CSI-RS, and may perform a number of processes to determine how to update the beam configuration and then to perform the beam configuration updating. Similarly, a base station may need a certain amount of processing time to update a beam configuration after receiving an aperiodic RS (e.g., SRS). In one specific example, if a UE transmitting an aperiodic SRS for PUCCH resources updates a PUCCH transmit beam after transmitting the aperiodic SRS, but before the processing timeline is complete at the base station, the base station may miss any PUCCH transmissions from the UE as the corresponding PUCCH receive beam will not be configured at the base station until the processing timeline for the aperiodic SRS is complete.

In contrast, a wireless communications system 100 that supports synchronizing timing for updating beam configuration information may coordinate the beam configuration updates between a base station 105 and a UE 115. In a first implementation, the wireless devices may be configured to transmit a confirmation message in response to an aperiodic RS. If a base station 105 transmits an aperiodic CSI-RS to a UE 115, but does not receive the expected confirmation message in response, the base station 105 may refrain from updating a beam configuration according to the aperiodic CSI-RS. Instead, the base station 105 may retransmit the aperiodic CSI-RS until receiving a confirmation message in response, at which time the base station 105 and UE 115 may both update their beam configurations. In this way, one device will not update a beam configuration without the other device performing a corresponding update.

In a second implementation, the wireless devices within the wireless communications system 100 may be configured to update a beam configuration according to a timer (e.g., an action time) associated with transmission timings. For example, both wireless devices may determine an expiration time for a timer based on scheduling information in DCI, the end of an aperiodic RS transmission, the end of a confirmation message transmission, or some combination of these. The wireless devices may update their beam configurations based on an aperiodic RS at this expiration time. In this way, both wireless devices may update their beam configurations at a same time, resulting in communication continuity between the devices and limiting of missed transmissions. This timer or action time may correspond to a processing timeline for the device receiving the aperiodic RS, such that at the timer expiration both devices are ready to update the beam configuration.

Figure 2:
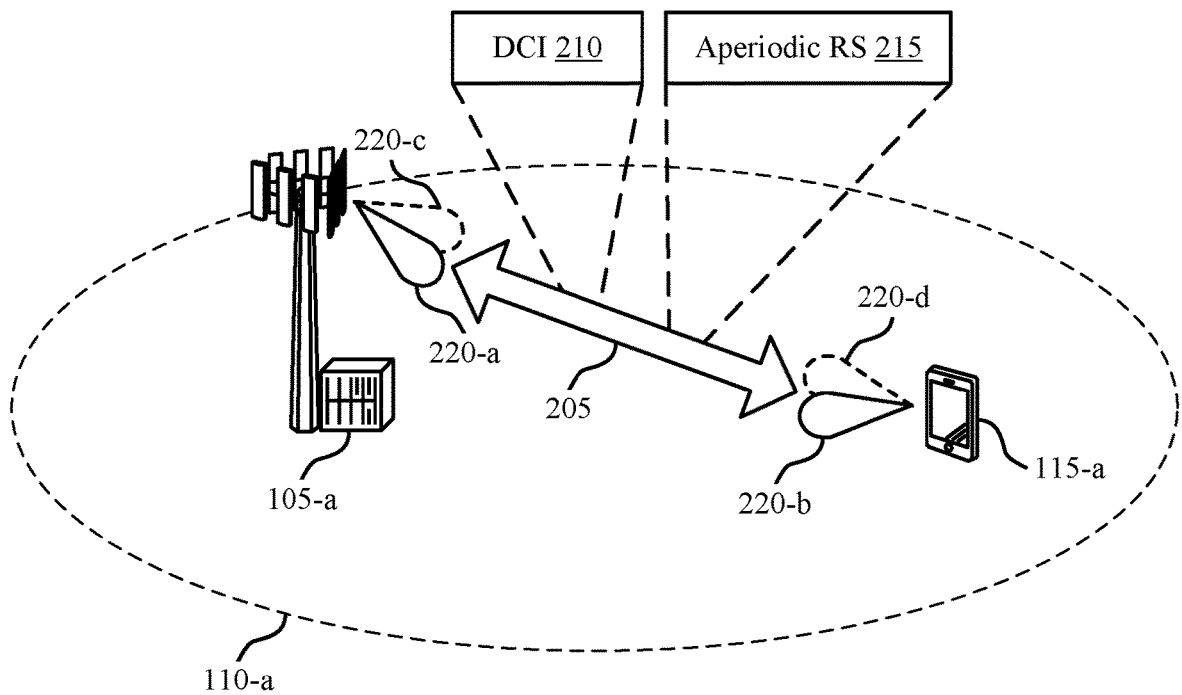
FIG. 2 illustrates an example of a wireless communications system that supports synchronizing timing for updating beam configuration information in accordance with aspects of the present disclosure.

FIG. 2 illustrates an example of a wireless communications system 200 that supports synchronizing timing for updating beam configuration information in accordance with aspects of the present disclosure. The wireless communications system 200 may include base station 105-*a* and UE 115-*a*, which may be examples of the corresponding devices described with reference to FIG. 1. Base station 105-*a* may provide network coverage for a geographic coverage area 110-*a*. UE 115-*a* and base station 105-*a* may communicate over a communication link 205 according to a beam configuration between UE 115-*a* and base station 105-*a*. A beam configuration may refer to any spatial relation information or QCL information indicating beam resources, such as a beam direction, a beam width, a beam identifier (ID), a spatial stream, etc. In certain examples, a beam configuration may be referred to as a beam indication, a beam indication of resources, or some similar terminology. In some cases, to update the beam configuration, either UE 115-*a* or base station 105-*a* may transmit an aperiodic RS 215, such as an aperiodic CSI-RS, an aperiodic SRS, or any other relevant RS for beam configuration. Timing for updating the spatial relation may be based on a response to the aperiodic RS 215 or a timer. For example, a wireless device may monitor for a confirmation message or an expiration of a timer to determine when to update a beam configuration and/or communicate using the updated beam configuration.

The wireless communications system 200 may support updating a spatial relation of uplink resources (e.g., a beam configuration for an uplink transmit beam at UE 115-*a*, an uplink receive beam at base station 105-*a*, or both). Additionally or alternatively, the wireless communications system 200 may support updating QCL information of downlink resources (e.g., a beam configuration for a downlink transmit beam at base station 105-*a*, a downlink receive beam at UE 115-*a*, or both). Such updates to the uplink beam configuration or downlink beam configuration may be performed based on an aperiodic RS 215 transmitted by either base station 105-*a* or UE 115-*a*. For example, base station 105-*a* may be communicating with UE 115-*a* using a beam configuration including one or more beams. The base station 105-*a* may determine to update the beam configuration. For example, the base station 105-*a* may determine (e.g., based on CSI feedback or channel reciprocity) to update a first beam of the beam configuration. The base station 105-*a* may determine to update the beam configuration based on determining that communications via the first beam may be degrading, but without or prior to receiving an indication of beam failure for the first beam from the UE 115-*a*. Base station 105-*a* may schedule one or more aperiodic RS 215 transmissions to signal a beam switch at UE 115-*a*, based on which UE 115-*a* may update the beam configuration from the first beam (e.g., configured according to a previous CSI-RS) to a second beam (e.g., according to the aperiodic RS 215). In some cases, the aperiodic RS 215 may be independent or different from other beams associated with reference signals transmitted by the base station 105-*a*. For example, the aperiodic RS 215 may be a different beam than beams associated with antenna ports of periodic cell-specific reference signals (CRS) or periodic CSI-RS.

To schedule the aperiodic RS 215, base station 105-*a* may transmit scheduling information in DCI 210 to UE 115-*a*. If the DCI 210 schedules an aperiodic CSI-RS, the DCI 210 may indicate a monitoring period for UE 115-*a* to monitor for and receive the aperiodic CSI-RS from base station 105-*a*. If the DCI 210 schedules an aperiodic SRS, the DCI 210 may indicate a transmission opportunity (TxOP) for UE 115-*a* to transmit the aperiodic SRS. Based on either the aperiodic CSI-RS or SRS, base station 105-*a* and UE 115-*a* may update a beam configuration for any uplink resources (e.g., uplink resources corresponding to an aperiodic SRS, a PUCCH, a PUSCH, or any combination of these), a beam configuration for any downlink resources (e.g., downlink resources corresponding to an aperiodic CSI-RS, a PDCCH, a PDSCH, or any combination of these), or both. DCI 210 may include an indicator of a beam or QCL resources for one or more beams associated with aperiodic SRS 215. For example, the indicator may indicate that aperiodic CSI-RS 215 is associated with a PDCCH, a PDSCH, or both, and UE 115-a may update the beam configuration (e.g., a receive beam) for channels associated with the aperiodic CSI-RS based on DCI 210, CSI-RS 215, and an action time associated with a response message or expiration of a timer. In some cases, updating a beam configuration may involve updating from a first set of beams (e.g., beams 220-a and 220-b) for transmission and reception to a second set of beams (e.g., beams 220-c and 220-d) for improved transmission and reception.

Base station 105-a and UE 115-a may determine when to update a beam configuration based on an event related to aperiodic RS 215. For example, the event may be based on a message received in response to an aperiodic RS 215, based on a timer corresponding to an action time and associated with updating the beam configuration, or based on a combination of these. In a first implementation, the wireless communications system 200 may support response messages (e.g., confirmation messages, feedback messages, etc.) to synchronize beam configuration updates between devices. For example, when a wireless device successfully receives an aperiodic RS 215, the device may transmit a certain type of message in response to the aperiodic RS 215. This response message may be an example of a channel state feedback message, an ACK/NACK message (e.g., an ACK message in the case of successful reception), a buffer status report, or any similar message associated with the received aperiodic RS 215 or a determined update to the beam configuration. Both wireless devices (e.g., the device transmitting the aperiodic RS 215 and the device transmitting the response message) may update a beam configuration based on the aperiodic RS 215 after the response message is transmitted (e.g., based on the transmission time for the response message, the reception time for the response message, a buffer period, or some combination of these). If the wireless device transmitting the aperiodic RS 215 does not receive a message in response, the wireless device may determine to not update the beam configuration based on the aperiodic RS 215. Instead, the wireless device may retransmit the aperiodic RS 215 (e.g., retransmit DCI 210 and RS 215), and may update the beam configuration only after receiving the expected message in response.

In a second implementation, the wireless communications system 200 may support timers—which may be referred to as an "action time" or "action time period"—to synchronize beam configuration updates between devices. In one example, wireless devices may not transmit responses to received aperiodic RSs 215. In this example, the wireless devices may implement timers based on either scheduling information in the DCI 210 or timing information for the transmitted aperiodic RS 215. For example, expiration of the timer may indicate an action time that is a certain duration after a start time for the timer. The start time may correspond to the start of aperiodic RS 215 transmission, the end of aperiodic RS 215 transmission, the start of aperiodic RS 215 reception, or the end of aperiodic RS 215 reception. The devices may identify this start time based on the scheduling information for the aperiodic RSs 215 contained in the DCI 210 or based on the actual aperiodic RS 215 transmission or reception. In a second example, wireless devices may transmit responses to received aperiodic RSs 215. In this example, the wireless devices may implement timers based on either scheduling information in the DCI 210 or timing information for the response message. For example, the start time for the timer may correspond to the start of transmission for the response message, the end of transmission for the response message, the start of reception for the response message, or the end of reception for the response message. Additionally or alternatively, the start time for the timer may correspond to the start of transmission of the DCI 210 or the end of transmission of the DCI 210. The devices may identify this start time based on scheduling information for the aperiodic RS 215 contained in the DCI 210, based on scheduling information for the response message contained in the DCI 210 or implicitly determined based on the aperiodic RS 215 timing, or based on the actual response message transmission or reception.

The timer or action time may specify a fixed value corresponding to a time duration after this start time to perform beam configuration updating. This time duration may be a number of symbols, slots, milliseconds (ms), or any other time interval (e.g., TTIs or sTTIs). In some cases, the time duration may be a pre-determined or pre-configured value (e.g., a fixed value for all aperiodic RS 215 transmissions). In other cases, the time duration may be based on one or more capabilities of the wireless devices (e.g., base station 105-a, UE 115-a, or both). For example, the time duration may be based on a processing timeline for UE 115-a or base station 105-a to process a received aperiodic RS 215. The time duration may be indicated in a transmission from one device to the other (e.g., UE capability message, RRC configuration message). For example, base station 105-a may dynamically indicate the time duration in the DCI 210. The time duration may be the same for any type of aperiodic RS 215 or may be different for different types of aperiodic RS 215. For example, the devices may use different time durations for the timer (e.g., to determine the action time) based on whether the aperiodic RS 215 is a CSI-RS or SRS, the type of resources corresponding to the aperiodic RS 215, etc.

The wireless devices may synchronize updating beam configurations based on expiration of the timer (e.g., based on the specific action time). Both wireless devices (e.g., the device transmitting the aperiodic RS 215 and the device receiving the aperiodic RS 215) may update a beam configuration based on the aperiodic RS 215 at the expiration time or prior to the expiration time, such that the wireless devices communicate using the updated beam configuration following expiration of the timer. For example, when an aperiodic RS 215 is transmitted to update spatial relation or QCL information, a certain action time is reserved with respect to the transmission timing for the aperiodic RS 215 or for a response message to the aperiodic RS 215. After this action time, both wireless devices may operate according to the updated spatial relation or QCL information, as the action time specifies the time at which the updates should be complete at both devices. In some cases, the wireless devices may continue to use a current beam configuration up until the action time. For example, even after a wireless device transmits the aperiodic RS 215 indicating updated resources to a second wireless device, both devices may continue to communicate using the non-updated resources until the indicated action time.

In some cases, an aperiodic RS 215 transmission may be unsuccessful (e.g., due to a UE 115 not successfully receiving the scheduling information in the DCI 210, interference in the channel during aperiodic RS 215 transmission, etc.). For example, a wireless device may be configured to receive a message in response to an aperiodic RS 215 transmission but may not receive this message. In these cases, base station 105-*a* may transmit DCI 210 scheduling an aperiodic RS 215 retransmission for the unsuccessful transmission. This DCI 210 scheduling the aperiodic RS 215 retransmission may be transmitted by base station 105-*a* prior to expiration of the timer or the action time for updating the beam configuration. Both wireless devices may update a timer or action time based on this scheduled retransmission.

In some cases, wireless devices may track aperiodic RS-specific action times. In these cases, if a device receives a DCI 210 scheduling a retransmission for an aperiodic RS 215, the device may update the action time for the aperiodic RS 215 based on the timing information for the retransmission. As the DCI 210 scheduling the retransmission may be received at the wireless device prior the action time for the initial transmission, both wireless devices (e.g., the device transmitting the aperiodic RS 215 and the device receiving the aperiodic RS 215) may update the action time to a later time (e.g., the action time corresponding to the retransmission of the aperiodic RS 215) and may not update the beam configuration until this later time. The wireless devices may not update action times corresponding to any other aperiodic RSs 215 (e.g., other types of RS, RS associated with different time-frequency resources, RS associated with different channels).

In other cases, wireless devices may track a common action time for all aperiodic RS transmissions (e.g., all beams of a beam configuration). In these cases, if a device is currently monitoring for an action time expiration for the common action time and receives a DCI 210 scheduling any aperiodic RS 215 transmission (e.g., an aperiodic RS 215 transmission for a different set of resources or a different channel, a retransmission of an aperiodic RS 215, etc.), the device may update the common action time based on timing information for the aperiodic RS 215 transmission. Accordingly, any aperiodic RS 215 transmission may update the action time for any previously transmitted aperiodic RSs 215 with beam configurations still pending.

Figures 3A, 3B:
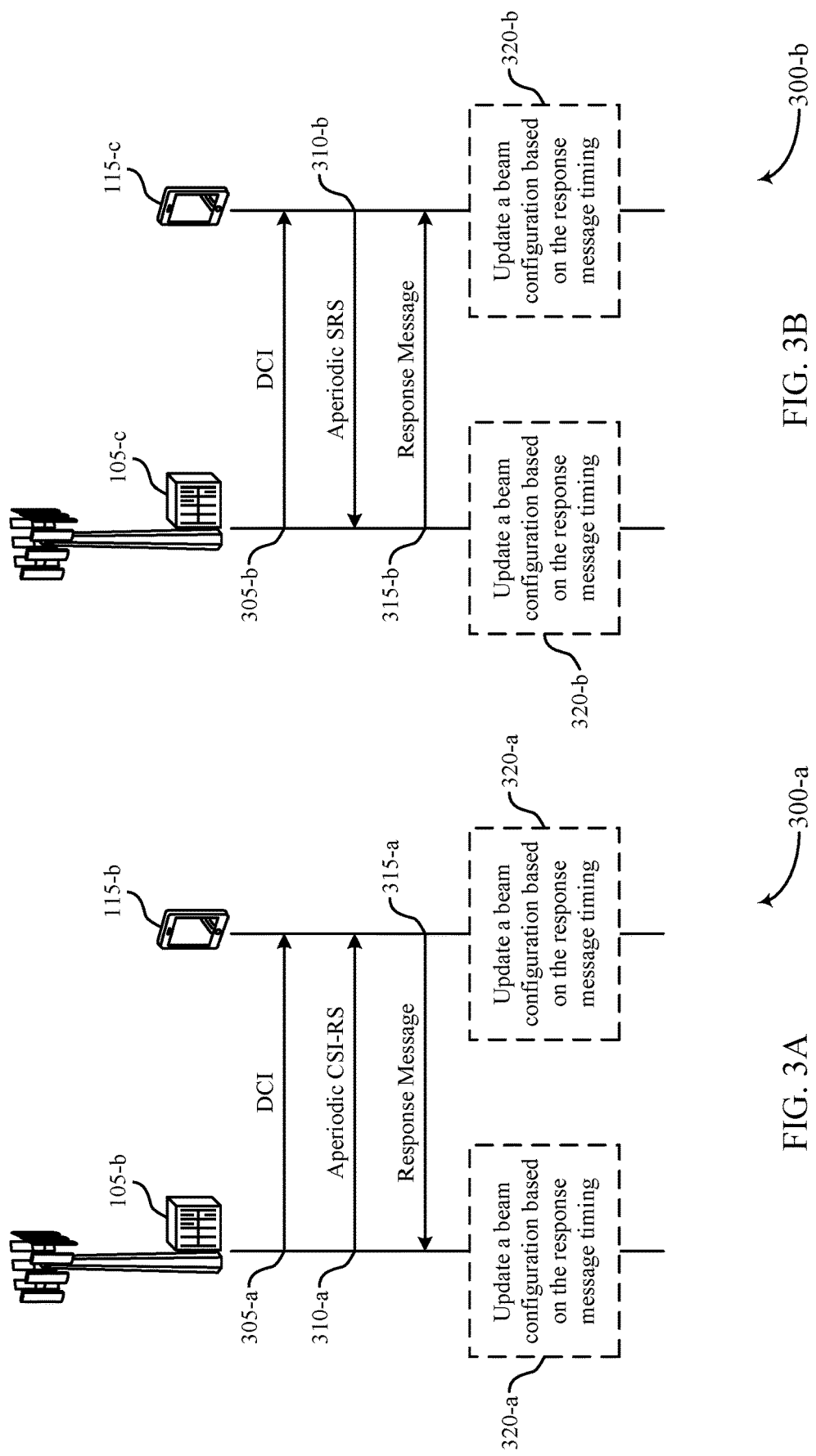

FIGS. 3A and 3B illustrate examples of process flows 300 implementing responses to aperiodic RSs that support synchronizing timing for updating beam configuration information in accordance with aspects of the present disclosure. FIG. 3A illustrates an example of a process flow 300-*a* corresponding to an aperiodic CSI-RS transmission. The process flow 300-*a* may include base station 105-*b* and UE 115-*b*, which may be examples of the corresponding devices described with respect to FIGS. 1 and 2. Base station 105-*b* and UE 115-*b* may synchronize updating a beam configuration (e.g., a spatial relation of uplink resources or QCL information of downlink resources) based on a response message.

For example, at 305-*a*, base station 105-*b* may transmit DCI scheduling for an aperiodic CSI-RS transmission to UE 115-*b*. The DCI may include an indicator of one or more beams or resources (e.g., channels) of a beam configuration for updating according to the aperiodic RS scheduled by the DCI. Base station 105-*b* may determine to update the beam configuration based on a change in channel quality, movement of base station 105-*b* or UE 115-*b*, a number of unsuccessful transmissions using a current beam configuration, a most recent aperiodic RS transmission, a load on the channel, etc. UE 115-*b* may monitor for the aperiodic CSI-RS according to the scheduling information contained in the DCI.

At 310-*a*, base station 105-*b* may transmit the aperiodic CSI-RS to UE 115-*b*. Base station 105-*b* may transmit the aperiodic CSI-RS during a TxOP indicated by the DCI. The aperiodic CSI-RS may be UE-specific (e.g., the aperiodic CSI-RS may not correspond to an antenna port for a periodic RS such as CRS or periodic CSI-RS). UE 115-*b* may be configured to transmit a certain type of response upon or after receiving the aperiodic CSI-RS (e.g., following an end of the aperiodic CSI-RS transmission). For example, the network may configure UE 115-*b* to provide the certain type of response. At 315-*a*, UE 115-*b* may transmit a response message to base station 105-*b* in response to receiving the aperiodic CSI-RS. The timing of the response message transmission may be based on scheduling information in the DCI or based on timing information for the aperiodic CSI-RS. The response message 315-*a* may be, for example, a channel state feedback report, an ACK/NACK message, a buffer status report, or some similar message. The response message 315-*a* may be transmitted via a control channel (e.g., PUCCH), or a data channel (e.g., PUSCH).

At 320-*a*, base station 105-*b*, UE 115-*b*, or both may update a beam configuration based on the aperiodic CSI-RS. This updating may be performed after the response message is transmitted (e.g., for base station 105-*b* to confirm that UE 115-*b* successfully received the aperiodic CSI-RS). In some cases, base station 105-*b* and UE 115-*b* may determine to update the beam configuration a certain time interval after the end of the response message transmission. In some cases, the updating involves both devices (e.g., base station 105-*b* and UE 115-*b*) updating a spatial relation. In other cases, one of the devices may update a spatial relation, while the other may maintain a current spatial relation. In yet other cases, base station 105-*b*, UE 115-*b*, or both may update QCL information based on the aperiodic CSI-RS. Prior to 320-*a* base station 105-*b* and UE 115-*b* may communicate according to the previously determined beam configuration, while after 320-*a* base station 105-*b* and UE 115-*b* may communicate according to the updated beam configuration.

FIG. 3B illustrates an example of a process flow 300-*b* corresponding to an aperiodic SRS transmission. The process flow 300-*b* may include base station 105-*c* and UE 115-*c*, which may be examples of the corresponding devices described with respect to FIGS. 1 and 2. Base station 105-*c* and UE 115-*c* may synchronize updating a beam configuration (e.g., a spatial relation of uplink resources or QCL information of downlink resources) based on a response message.

For example, at 305-*b*, base station 105-*c* may transmit DCI to UE 115-*c* in order to indicate scheduling for an aperiodic SRS transmission. The DCI may include an indicator of one or more beams or resources (e.g., channels) of a beam configuration for updating according to the aperiodic SRS scheduled by the DCI. Base station 105-*c* may monitor for the aperiodic SRS according to the scheduling information contained in the DCI. At 310-*b*, UE 115-*c* may transmit the aperiodic SRS to base station 105-*c*. UE 115-*c* may transmit the aperiodic SRS during a TxOP indicated by the DCI. Base station 105-*c* may be configured to transmit a certain type of response upon or after receiving the aperiodic SRS (e.g., following an end of the aperiodic SRS transmission). At 315-*b*, base station 105-*c* may transmit a response message to UE 115-*c* in response to receiving the aperiodic SRS. The timing of the response message transmission may be based on scheduling information in the DCI or based on timing information for the aperiodic SRS. At 320-*b*, base station 105-*c*, UE 115-*c*, or both may update a beam configuration based on the aperiodic SRS. This updating may be performed after the response message is transmitted (e.g., for UE 115-*c* to confirm that base station 105-*c* successfully received the aperiodic SRS). Prior to 320-*b* base station 105-*c* and UE 115-*c* may communicate according to the previously determined beam configuration, while after 320-*b*, base station 105-*c* and UE 115-*c* may communicate according to the updated beam configuration.

FIGS. 4A and 4B illustrate examples of process flows 400 implementing timers that support synchronizing timing for updating beam configuration information in accordance with aspects of the present disclosure. FIG. 4A illustrates an example of a process flow 400-*a* corresponding to an aperiodic CSI-RS transmission. The process flow 400-*a* may include base station 105-*d* and UE 115-*d*, which may be examples of the corresponding devices described with respect to FIGS. 1 and 2. Base station 105-*d* and UE 115-*d* may synchronize updating a beam configuration (e.g., a spatial relation of uplink resources or QCL information of downlink resources) based on a timer. A timer may refer to any mechanism or operation for determining a time to perform an operation based on a reference time. As described herein, the reference time for the timer may be associated with DCI scheduling, an aperiodic RS transmission, a confirmation message, or any combination of these, and the operation for the timer may correspond to switching communications to an updated beam configuration.

At 405-*a*, base station 105-*d* may transmit DCI scheduling for an aperiodic CSI-RS transmission to UE 115-*d*. The DCI may include an indicator of one or more beams or resources (e.g., channels) of a beam configuration for updating according to the aperiodic CSI-RS scheduled by the DCI. UE 115-*d* may monitor for the aperiodic CSI-RS according to the scheduling information contained in the DCI.

At 410-*a*, base station 105-*d* may transmit the aperiodic CSI-RS to UE 115-*d*. Base station 105-*d* may transmit the aperiodic CSI-RS during a TxOP indicated by the DCI. The aperiodic CSI-RS may be UE-specific (e.g., the aperiodic CSI-RS may not correspond to an antenna port for a periodic RS such as CRS or periodic CSI-RS). Base station 105-*d* may additionally start a timer at 415-*a* associated with updating a beam configuration with UE 115-*d*. In some cases, base station 105-*d* may start the timer based on scheduling information for the aperiodic CSI-RS in the DCI. In other cases, base station 105-*d* may start the timer based on the end of a transmission time for the aperiodic CSI-RS transmission. In yet other cases, base station 105-*d* may start the timer based on timing associated with receiving a response message from UE 115-*d*. UE 115-*d* may start a corresponding timer (e.g., upon receiving the DCI scheduling, receiving the aperiodic CSI-RS, or transmitting a confirmation message).

At 420-*a*, UE 115-*d* may process the aperiodic CSI-RS. This may involve the UE 115-*d* determining parameters for a receive beam associated with the CSI-RS (e.g., performing a receive beam sweep or other process to identify a receive beam for receiving channels associated with the aperiodic CSI-RS). UE 115-*d* may perform the processing according to a processing timeline that may be UE-specific or specific to the type of aperiodic RS. Upon completion of the processing, UE 115-*d* may be prepared to update a beam configuration with base station 105-*d* based on the received aperiodic CSI-RS. The timer may include a time duration longer than the processing timeline for UE 115-*d* such that the timer does not expire until after UE 115-*d* has completed processing of the aperiodic CSI-RS.

At 425-*a*, both base station 105-*d* and UE 115-*d* may update the beam configuration based on the aperiodic CSI-RS. This updating may be performed such that base station 105-*d* and UE 115-*d* may communicate according to the updated beam configuration upon expiration of the timer. That is, prior to 425-*a*, base station 105-*d* and UE 115-*d* may communicate according to the previously configured beam configuration, while after 425-*a*, base station 105-*d* and UE 115-*d* may communicate according to the updated beam configuration.

In some aspects, base station 105-*d* may transmit an aperiodic CSI-RS transmission to update a spatial relation, and the network may configure UE 115-*d* to transmit a certain type of channel state feedback in response to the aperiodic CSI-RS. A timer (e.g., an action time) may be defined based on the end of the channel state feedback transmission. For example, the timer may specify for base station 105-*d* and UE 115-*d* to have the updated spatial relation ready X symbols after the end of the channel state feedback transmission, where X may be based on a pre-configured value, a capability of UE 115-*d* (e.g., based on the processing timeline for the aperiodic CSI-RS at UE 115-*d*), or a dynamic value configured for the devices.

FIG. 4B illustrates an example of a process flow 400-*b* corresponding to an aperiodic SRS transmission. The process flow 400-*b* may include base station 105-*e* and UE 115-*e*, which may be examples of the corresponding devices described with respect to FIGS. 1 and 2. Base station 105-*e* and UE 115-*e* may synchronize updating a beam configuration (e.g., a spatial relation of uplink resources or QCL information of downlink resources) based on a timer. A timer may refer to any mechanism or operation for determining a time to perform an operation based on a reference time. As described herein, the reference time may be associated with DCI scheduling, an aperiodic RS transmission, a confirmation message, or any combination of these, and the operation may correspond to switching communications to an updated beam configuration.

At 405-*b*, base station 105-*e* may transmit DCI scheduling for an aperiodic SRS transmission to UE 115-*e*. The DCI may include an indicator of one or more beams or resources (e.g., channels) of a beam configuration for updating according to the aperiodic SRS scheduled by the DCI. Base station 105-*e* may monitor for the aperiodic SRS according to the scheduling information contained in the DCI.

At 410-*b*, UE 115-*e* may transmit the aperiodic SRS to base station 105-*e*. UE 115-*e* may start a timer at 415-*b* associated with updating a beam configuration based on the aperiodic SRS. In some cases, UE 115-*e* may start the timer based on scheduling information for the aperiodic SRS in the DCI. In other cases, UE 115-*e* may start the timer based on transmission timing for the aperiodic SRS transmission. In yet other cases, UE 115-*e* may start the timer based on timing associated with receiving a response message from base station 105-*e*. Base station 105-*e* may start a corresponding timer (e.g., upon or after transmitting the DCI scheduling, receiving the aperiodic SRS, or transmitting a confirmation message).

At 420-*b*, base station 105-*e* may process the aperiodic SRS. This may involve the base station 105-*e* determining a beam configuration based on the aperiodic SRS. At 425-*b*, both base station 105-*e* and UE 115-*e* may update a beam configuration for communication between base station 105-*e* and UE 115-*e* based on the aperiodic SRS. This updating may be performed such that base station 105-*e* and UE 115-*e* can communicate according to the updated beam configuration upon expiration of the timer. That is, prior to 425-*b*, base station 105-*e* and UE 115-*e* may communicate according to the previously configured beam configuration, while after 425-*b*, base station 105-*e* and UE 115-*e* may communicate according to the updated beam configuration.

In some aspects, UE 115-*e* may transmit an aperiodic SRS transmission to update a spatial relation. A timer (e.g., an action time) may be defined based on the end of the aperiodic SRS transmission. For example, the timer may specify for base station 105-*e* and UE 115-*e* to have the updated spatial relation ready Y symbols after the end of the SRS transmission, where Y may be based on a pre-configured value, a capability of base station 105-*e* (e.g., based on the processing timeline for the aperiodic SRS at base station 105-*e*), or a dynamic value configured for the devices. Y may be equal to or different than X. Both UE 115-*e* and base station 105-*e* may communicate according to the updated spatial relation after the action time (e.g., based on the synchronized beam configuration procedure).

Figure 5:
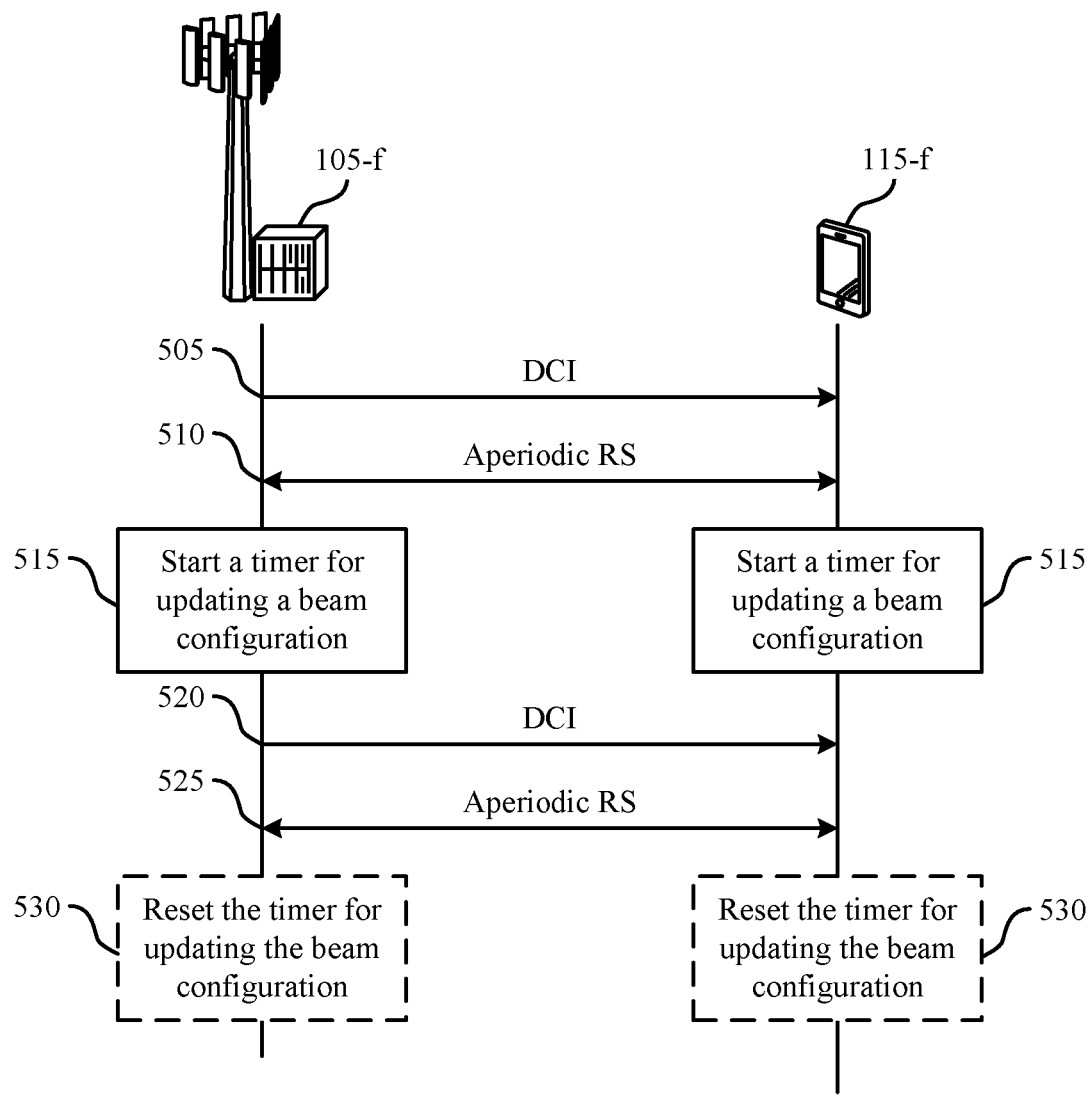

FIG. 5 illustrates an example of a process flow 500 implementing timers that support synchronizing timing for updating beam configuration information in accordance with aspects of the present disclosure. The process flow 500 may include base station 105-*f* and UE 115-*f*, which may be examples of the corresponding devices described with respect to FIGS. 1 through 4. Base station 105-*f* and UE 115-*f* may synchronize updating a beam configuration (e.g., a spatial relation of uplink resources or QCL information of downlink resources) based on one or more timers. A timer may refer to any mechanism or operation for determining a time to perform an operation based on a reference time. As described herein, the reference time for the timer may be associated with DCI scheduling, an aperiodic RS transmission, a confirmation message, or any combination of these, and the operation for the timer may correspond to switching communications to an updated beam configuration.

At 505, base station 105-*f* may transmit DCI scheduling for an aperiodic RS transmission to UE 115-*f*. This aperiodic RS transmission may be an example of an aperiodic CSI-RS or an aperiodic SRS. At 510, base station 105-*f* or UE 115-*f* may transmit the aperiodic RS as scheduled by the DCI. However, a receiving device may be configured to respond with a confirmation message to an aperiodic RS. Without a confirmation message response, base station 105-*f* may retransmit scheduling information in a DCI.

At 515, base station 105-*f*, UE 115-*f*, or both may start a timer for updating a beam configuration between the devices. This timer may be started based on the DCI transmission, the aperiodic RS transmission, or a confirmation message transmission. The expiration of the timer may correspond to both base station 105-*f* and UE 115-*f* communicating over an updated beam configuration. However, if base station 105-*f* does not receive a confirmation signal or an aperiodic SRS during the duration of the timer, the base station 105-*f* may retransmit DCI at 520 scheduling an aperiodic RS retransmission. For example, base station 105-*f* may set a monitoring period for a confirmation signal (e.g., in response to a transmitted aperiodic CSI-RS) or an aperiodic SRS, where the monitoring period expires prior to the timer. If the monitoring period expires, base station 105-*f* may retransmit the DCI. In some cases, base station 105-*f* or UE 115-*f* may retransmit the aperiodic RS at 525.

At 530, base station 105-*f*, UE 115-*f*, or both may reset the timer for updating the beam configuration between the devices. This resetting may be based on receiving the DCI scheduling another aperiodic RS before expiration of the timer or based on transmitting or receiving the aperiodic RS before expiration of the timer. By resetting the timer, base station 105-*f* or UE 115-*f* may refrain from updating the beam configuration according to the original action time if there is no confirmation that the other device is prepared to update the beam configuration.

In one example, base station 105-*f* and UE 115-*f* may maintain individual action times (e.g., timers) for each aperiodic RS transmission. In this case, the devices may reset the timer at 530 if the aperiodic RS transmitted at 525 is a retransmission of the aperiodic RS transmitted at 510. If not, the devices may not reset the timer, and instead may start a new timer for the aperiodic RS transmitted at 525 (e.g., as this may correspond to a different type of RS or different resources). In a second example, base station 105-*f* and UE 115-*f* may maintain a common action time (e.g., timer) for all aperiodic RS transmissions. In this case, the devices may reset the timer at 530 whether or not the aperiodic RSs transmitted at 510 and 525 are correlated.

Figure 6:
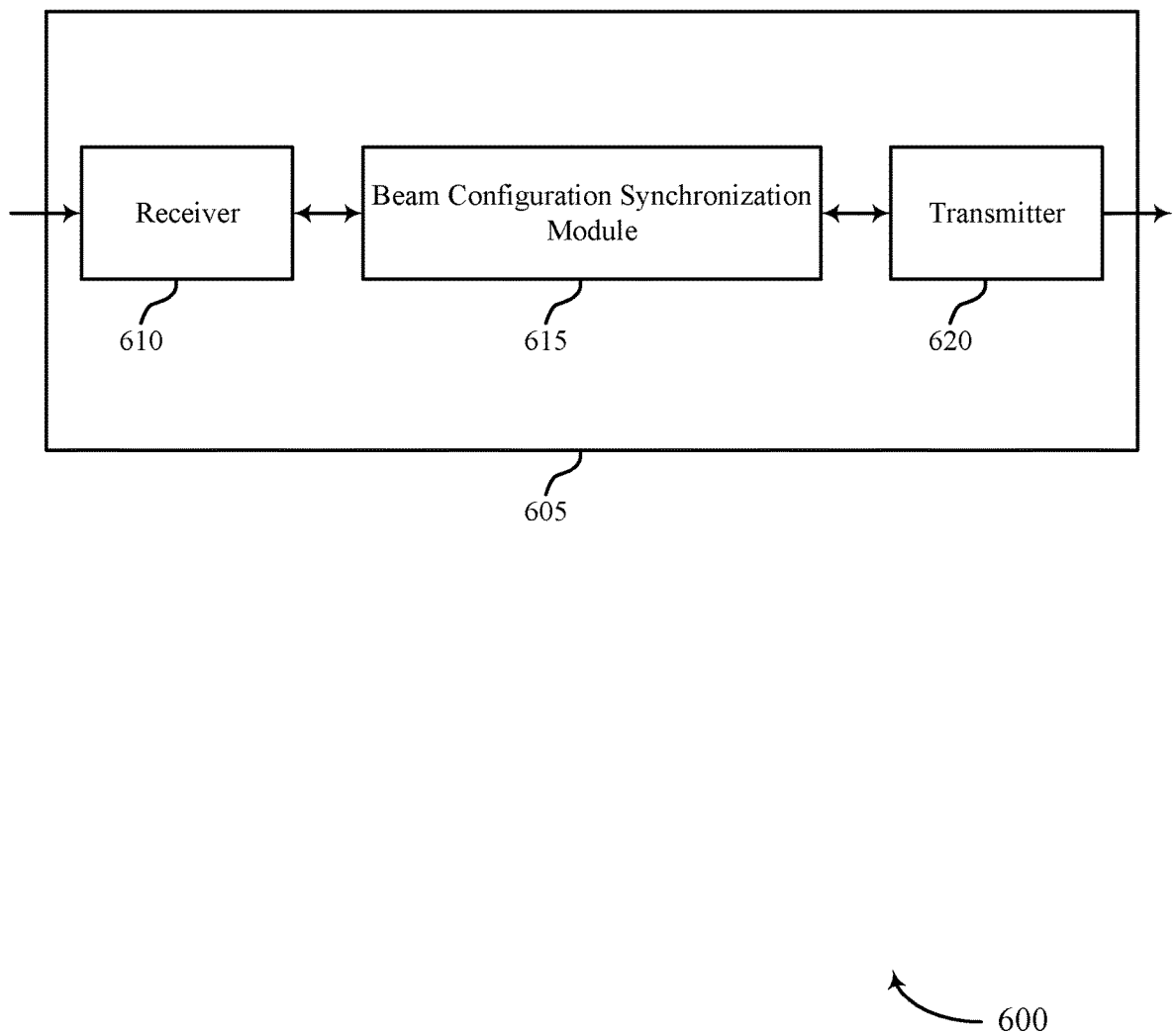
FIGS. 6 and 7 show block diagrams of devices that support synchronizing timing for updating beam configuration information in accordance with aspects of the present disclosure.

FIG. 6 shows a block diagram 600 of a device 605 that supports synchronizing timing for updating beam configuration information in accordance with aspects of the present disclosure. The device 605 may be an example of aspects of a UE 115 or base station 105 as described herein. The device 605 may include a receiver 610, a beam configuration synchronization module 615, and a transmitter 620. The device 605 may also include a processor. Each of these components may be in communication with one another (e.g., via one or more buses).

Receiver 610 may receive information such as packets, user data, or control information associated with various information channels (e.g., control channels, data channels, and information related to synchronizing timing for updating beam configuration information, etc.). Information may be passed on to other components of the device 605. The receiver 610 may be an example of aspects of the transceiver 920 or 1020 as described with reference to FIGS. 9 and 10. The receiver 610 may utilize a single antenna or a set of antennas.

The beam configuration synchronization module 615 may transmit, from a first device to a second device configured to use a first beam configuration for communicating between the first device and the second device, a first aperiodic RS associated with a second beam configuration for communicating between the first device and the second device, monitor for at least one of an expiration of a timer associated with an update to the second beam configuration or a confirmation message from the second device indicating that the first aperiodic RS was received at the second device, and communicate with the second device according to the second beam configuration based on the monitoring.

The beam configuration synchronization module 615 may also receive, at a first device configured to use a first beam configuration for communicating between the first device and a second device, a first aperiodic RS associated with a second beam configuration for communicating between the first device and the second device, identify an event for updating to the second beam configuration, and communicate with the second device according to the second beam configuration based on the identifying. The beam configuration synchronization module 615 may be an example of aspects of the beam configuration synchronization module 910 or 1010 as described herein.

The beam configuration synchronization module 615, or its sub-components, may be implemented in hardware, code (e.g., software or firmware) executed by a processor, or any combination thereof. If implemented in code executed by a processor, the functions of the beam configuration synchronization module 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The beam configuration synchronization module 615, or its sub-components, may be physically located at various positions, including being distributed such that portions of functions are implemented at different physical locations by one or more physical components. In some examples, the beam configuration synchronization module 615, or its sub-components, may be a separate and distinct component in accordance with various aspects of the present disclosure. In some examples, the beam configuration synchronization module 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 620 may transmit signals generated by other components of the device 605. In some examples, the transmitter 620 may be collocated with a receiver 610 in a transceiver module. For example, the transmitter 620 may be an example of aspects of the transceiver 920 or 1020 as described with reference to FIGS. 9 and 10. The transmitter 620 may utilize a single antenna or a set of antennas.

Figure 7:
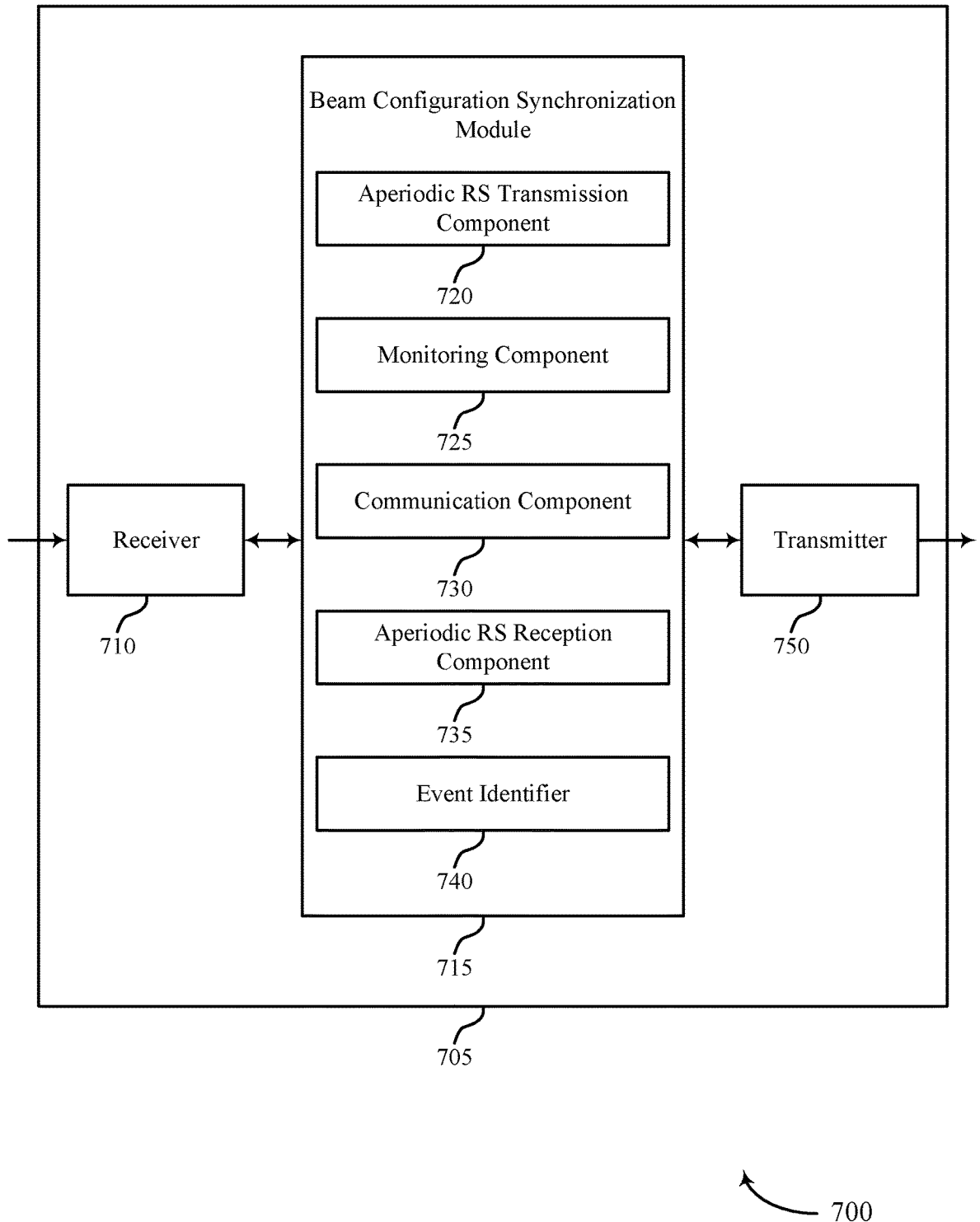

FIG. 7 shows a block diagram 700 of a device 705 that supports synchronizing timing for updating beam configuration information in accordance with aspects of the present disclosure. The device 705 may be an example of aspects of a device 605, a UE 115, or a base station 105 as described herein. The device 705 may include a receiver 710, a beam configuration synchronization module 715, and a transmitter 750. The device 705 may also include a processor. Each of these components may be in communication with one another (e.g., via one or more buses).

Receiver 710 may receive information such as packets, user data, or control information associated with various information channels (e.g., control channels, data channels, and information related to synchronizing timing for updating beam configuration information, etc.). Information may be passed on to other components of the device 705. The receiver 710 may be an example of aspects of the transceiver 920 or 1020 as described with reference to FIGS. 9 and 10. The receiver 710 may utilize a single antenna or a set of antennas.

The beam configuration synchronization module 715 may be an example of aspects of the beam configuration synchronization module 615 as described herein. The beam configuration synchronization module 715 may include an aperiodic RS transmission component 720, a monitoring component 725, a communication component 730, an aperiodic RS reception component 735, and an event identifier 740. The beam configuration synchronization module 715 may be an example of aspects of the beam configuration synchronization module 910 or 1010 as described herein.

In a first implementation, the aperiodic RS transmission component 720 may transmit, from a first device to a second device configured to use a first beam configuration for communicating between the first device and the second device, a first aperiodic RS associated with a second beam configuration for communicating between the first device and the second device. The monitoring component 725 may monitor for at least one of an expiration of a timer associated with an update to the second beam configuration or a confirmation message from the second device indicating that the first aperiodic RS was received at the second device. The communication component 730 may communicate with the second device according to the second beam configuration based on the monitoring.

In a second implementation, the aperiodic RS reception component 735 may receive, at a first device configured to use a first beam configuration for communicating between the first device and a second device, a first aperiodic RS associated with a second beam configuration for communicating between the first device and the second device. The event identifier 740 may identify an event for updating to the second beam configuration. The communication component 730 may communicate with the second device according to the second beam configuration based on the identifying.

Transmitter 750 may transmit signals generated by other components of the device 705. In some examples, the transmitter 750 may be collocated with a receiver 710 in a transceiver module. For example, the transmitter 750 may be an example of aspects of the transceiver 920 or 1020 as described with reference to FIGS. 9 and 10. The transmitter 750 may utilize a single antenna or a set of antennas.

Figure 8:
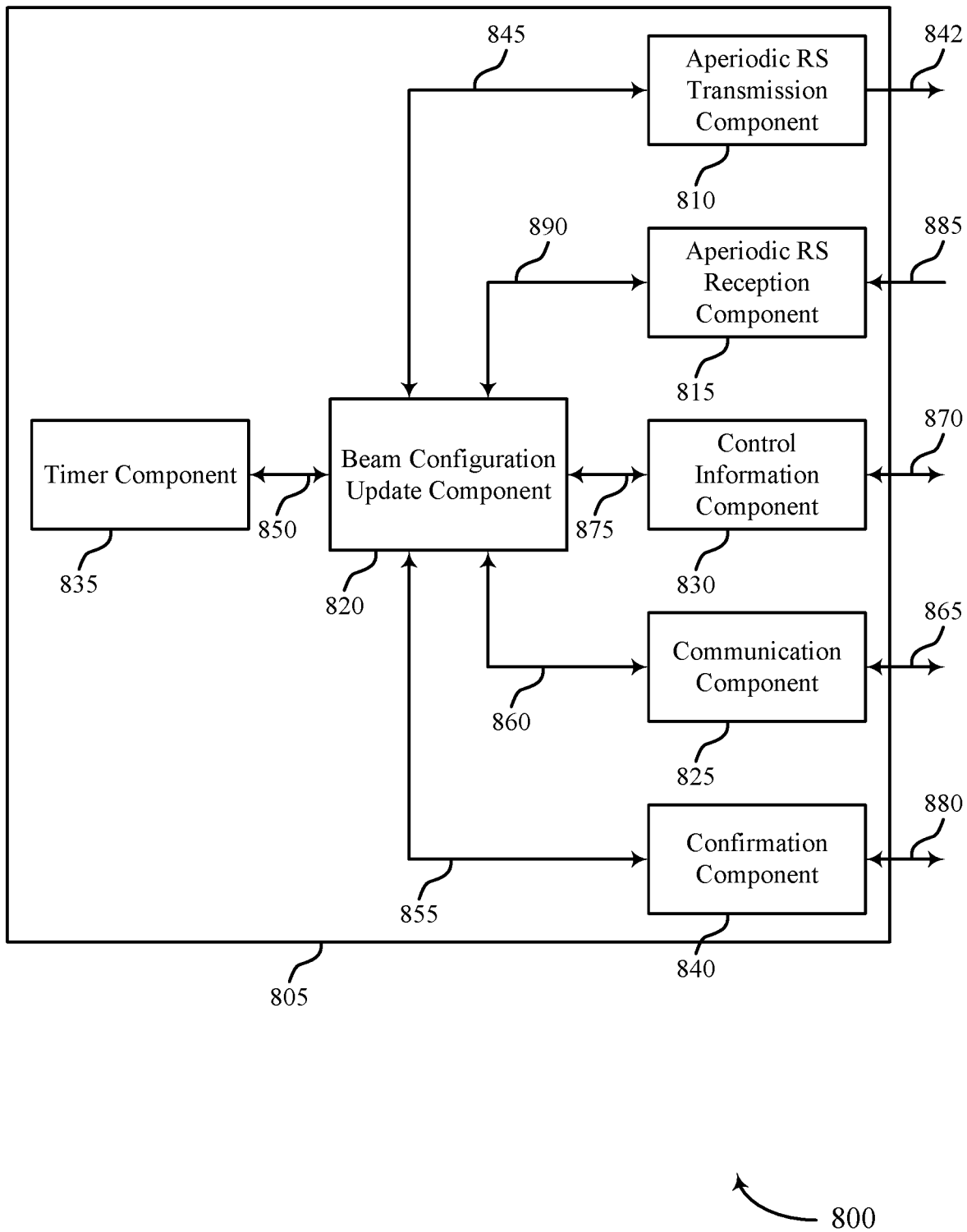
FIG. 8 shows a block diagram of a beam configuration synchronization module that supports synchronizing timing for updating beam configuration information in accordance with aspects of the present disclosure.

FIG. 8 shows a block diagram 800 of a beam configuration synchronization module 805 that supports synchronizing timing for updating beam configuration information in accordance with aspects of the present disclosure. The beam configuration synchronization module 805 may be an example of aspects of a beam configuration synchronization module 615, a beam configuration synchronization module 715, or a beam configuration synchronization module 910 described herein. The beam configuration synchronization module 805 may include an aperiodic RS transmission component 810, an aperiodic RS reception component 815, a beam configuration update component 820, a communication component 825, a control information component 830, and a timer component 835. Each of these modules may communicate, directly or indirectly, with one another (e.g., via one or more buses).

In an implementation, the aperiodic RS transmission component 810 may transmit, from a first device (e.g., the UE or base station including the aperiodic RS transmission component 810) to a second device (e.g., a second UE or base station with which the first device is to communicate) configured to use a first beam configuration for communicating between the first device and the second device, a signal 842 including one or more aperiodic RSs (e.g., via a transmitter 620 or a transmitter 750, as described with reference to FIGS. 6 and 7, respectively). For example, the signal 842 may include a first aperiodic RS associated with a second beam configuration for communicating between the first device and the second device. In some examples, the first aperiodic RS may be an example of or include a CSI-RS or an SRS.

In some examples, the aperiodic RS transmission component 810 may pass information 845 to the beam configuration update component 820 indicating, for example, that the signal 842 including the first aperiodic RS was transmitted to the second device.

In some examples, the first beam configuration may include first spatial relation information associated with a first uplink transmit beam at the first device or the second device and a first uplink receive beam at the second device or the first device. In some examples, the second beam configuration may include second spatial relation information associated with a second uplink transmit beam at the first device or the second device and a second uplink receive beam at the second device or the first device. In some examples, the first and second uplink transmit beams may be associated with a common set of beam parameters.

In other examples, the first beam configuration may include first QCL information associated with a first downlink transmit beam at the first device or the second device and a first downlink receive beam at the second device or the first device. In some examples, the second beam configuration may include second QCL information associated with a second downlink transmit beam at the first device or the second device and a second downlink receive beam at the second device or the first device. In some examples, the first and second downlink transmit beams are associated with a common set of beam parameters.

The beam configuration update component 820 may monitor for at least one of an expiration of a timer associated with an update to the second beam configuration or a confirmation message from the second device indicating that the first aperiodic RS transmitted by the aperiodic RS transmission component 810 was received at the second device. For example, the beam configuration update component 820 may exchange information 850 with the timer component 835, and the beam configuration update component 820 may monitor for information 850 from the timer component 835 that may indicate the expiration of the timer. Additionally or alternatively, the beam configuration update component 820 may exchange information 855 with the configuration component 840, and the beam configuration update component 820 may monitor for information 855 from the configuration component 840 that may indicate reception of the confirmation message from the second device.

In some examples, the communication component 825 may communicate with the second device according to the first beam configuration, or the communication component 825 may communicate with the second device according to the second beam configuration, for example, according to the monitoring at the beam configuration update component 820. For example, the communication component 825 may exchange information 860 with the beam configuration update component 820, and the beam configuration update component 820 may pass information 860 to the communication component 825 indicating a certain beam configuration (e.g., the first beam configuration or the second beam configuration). Based on the information 860 received from the beam configuration update component 820, the communication component 825 may send or receive signals 865 to the second device using transmit and receive beams synchronized with the corresponding receive and transmit beams of the second device (e.g., via a transmitter 620 and receiver 610 or a transmitter 750 and receiver 710, as described with reference to FIGS. 6 and 7, respectively).

In some examples, communicating the signals 865 with the second device according to the second beam configuration may occur after the expiration of the timer (e.g., after synchronizing respective transmit and receive beams following the expiration of the timer). In some examples, the communication component 820 may communicate the signals 865 with the second device according to the first beam configuration prior to the expiration of the timer or receiving the confirmation message. In some examples, the communication component 820 may pass information 860 to the beam configuration update component 820 according to the signals 865 received from the second device.

The control information component 830 may transmit, to the second device, signals 870 including a control information message (e.g., a DCI message), where the control information message may include scheduling information 875 associated with the first aperiodic RS. In some examples, the scheduling information 875 may include a start time for a TxOP for the first aperiodic RS, an end time for the TxOP for the first aperiodic RS, a duration for the timer, or a combination. For example, the control information component 830 may pass scheduling information 875 received in the signals 870 from the second device (e.g., via a receiver 610 or a receiver 710, as described with reference to FIGS. 6 and 7, respectively) to schedule further communications at the first device. In other implementations, the beam configuration update component 820 may pass scheduling information 875 to the control information component 830, and the control information component 830 may indicate the scheduling information 875 in signals 870 transmitted to the second device (e.g., via a transmitter 620 or a transmitter 750, as described with reference to FIGS. 6 and 7, respectively).

In some examples, the timer component 835 may start the timer after an end of receiving the confirmation message (e.g., after receiving information 850 from the beam configuration update component 820 indicating the reception of the confirmation message). Additionally or alternatively, the timer component 835 may start the timer after an end of transmitting the first aperiodic RS (e.g., at a scheduled time for the first aperiodic RS transmission, or based on information 850 indicating the transmission). Additionally or alternatively, the timer component 835 may start the timer after an end of transmitting the DCI message, for example, in the signals 870 via the control information component 830. In some examples, the timer component 835 may identify a value for the timer based on a predetermined value for the timer or an indication of the value for the timer received from the second device (e.g., according to scheduling information 875 indicated in the signaling 870 received by the control information component 830 and passed to the timer component 835 via the beam configuration update component 820).

The timer component 835 may identify an expiration time of the timer. In some examples, the timer component 835 may pass information 850 indicating the expiration time to the beam configuration update component 820. According to the information 850 (and, e.g., based on not having received information 855 indicating reception of a confirmation message), the beam configuration update component 820 may pass corresponding information 845 to the aperiodic RS transmission component 810 indicating that the aperiodic RS transmission component 810 is to transmit one or more additional RSs. For example, the aperiodic RS transmission component 810 may transmit a second aperiodic RS to the second device prior to the expiration time of the timer based on failing to receive, from the second device, the confirmation message that the first aperiodic RS was received at the second device.

The confirmation component 840 may receive signaling 880 including a confirmation message from the second device, where the confirmation message may indicate that the first aperiodic RS was received at the second device. In some examples, the confirmation message may include a channel state feedback report, an acknowledgement/negative-acknowledgement message, a buffer status report, or a combination. In some examples, the communication component 820 may monitor a set of resources (e.g., a set of time, frequency, and/or spatial resources allocated in previous DCI) configured for confirmation messages. After an end of receiving the signaling 880 including the confirmation message (e.g., following an end of the signaling 880), the confirmation component 840 may pass information 855 to the beam configuration update component 820 indicating that the confirmation message was received from the second device.

In an implementation, the aperiodic RS reception component 815 may receive, at the first device configured to use the first beam configuration for communicating between the first device and the second device, a signal 885 including one or more aperiodic RSs (e.g., via a receiver 610 or a receiver 710, as described with reference to FIGS. 6 and 7, respectively). For example, the signal 885 may include a first aperiodic RS associated with a second beam configuration for communicating between the first device and the second device. In some examples, the aperiodic RS reception component 815 may pass information 890 to the beam configuration update component 820 indicating, for example, that the signal 885 including the first aperiodic RS was received from the second device.

In some examples, the first aperiodic RS may be an example of or include an aperiodic CSI-RS or an SRS. In some examples, the first aperiodic RS may be associated with a first set of resources (e.g., a set of time, frequency, and/or spatial resources allocated for RS signal transmissions in previous DCI). In some examples, the first set of resources may include an uplink control channel, an uplink data channel, a downlink control channel, a downlink data channel, a bandwidth part, a sub-band, a set of time-resources, or a combination.

In some examples, the first beam configuration may include first spatial relation information associated with a first uplink transmit beam at the second device or the first device and a first uplink receive beam at the first device or the second device. In some examples, the second beam configuration may include second spatial relation information associated with a second uplink transmit beam at the second device or the first device and a second uplink receive beam at the first device or the second device.

In other examples, the first beam configuration may include first QCL information associated with a first downlink transmit beam at the second device or the first device and a first downlink receive beam at the first device or the second device. In some examples, the second beam configuration may include second QCL information associated with a second downlink transmit beam at the second device or the first device and a second downlink receive beam at the first device or the second device.

The beam configuration update component 820 may identify an event for updating to the second beam configuration. For example, the beam configuration update component 820 may exchange information 850 with the timer component 835, and the beam configuration update component 820 may monitor for information 850 from the timer component 835 that may indicate the expiration of the timer. Additionally or alternatively, the beam configuration update component 820 may exchange information 855 with the configuration component 840, and the beam configuration update component 820 may monitor for information 855 from the configuration component 840 that may indicate transmission of the confirmation message to the first device.

In some examples, the communication component 825 may communicate with the second device according to the first beam configuration, or the communication component 825 may communicate with the second device based on, for example, the beam configuration update component 820 identifying an event for updating to the second beam configuration. For example, the communication component 825 may exchange information 860 with the beam configuration update component 820, and the beam configuration update component 820 may pass information 860 to the communication component 825 indicating a certain beam configuration (e.g., the first beam configuration or the second beam configuration). Based on the information 860 received from the beam configuration update component 820, the communication component 825 may send or receive signals 865 to the second device using transmit and receive beams synchronized with the corresponding receive and transmit beams of the second device (e.g., via a transmitter 620 and receiver 610 or a transmitter 750 and receiver 710, as described with reference to FIGS. 6 and 7, respectively).

In some examples, communicating the signals 865 with the second device according to the second beam configuration may occur after the expiration of the timer (e.g., after synchronizing respective transmit and receive beams following the expiration of the timer). In some examples, the communication component 820 may communicate the signals 865 with the second device according to the first beam configuration prior to an identified event for updating to the second beam configuration. In some examples, the communication component 820 may pass information 860 to the beam configuration update component 820 according to the signals 865 communicated with the second device.

The control information component 830 may transmit, to the second device, signals 870 including a control information message (e.g., a DCI message), where the control information message may include scheduling information 875 associated with the first aperiodic RS. In some examples, the scheduling information 875 may include a start time for a TxOP for the first aperiodic RS, an end time for the TxOP for the first aperiodic RS, a duration for the timer, or a combination. For example, the control information component 830 may pass scheduling information 875 received in the signals 870 from the second device (e.g., via a receiver 610 or a receiver 710, as described with reference to FIGS. 6 and 7, respectively) to schedule further communications at the first device. In other implementations, the beam configuration update component 820 may pass scheduling information 875 to the control information component 830, and the control information component 830 may indicate the scheduling information 875 in signals 870 transmitted to the second device (e.g., via a transmitter 620 or a transmitter 750, as described with reference to FIGS. 6 and 7, respectively).

In some examples, the timer component 835 may start a timer, for example, to identify an event for updating to the second beam configuration. For example, the timer component 835 may start the timer after an end of receiving the first aperiodic RS (e.g., after receiving information 850 from the beam configuration update component 820 indicating the reception of the first aperiodic RS, e.g., at the aperiodic RS reception component 815). Additionally or alternatively, the timer component 835 may start the timer after an end of transmitting the confirmation message (e.g., after receiving information 850 from the beam configuration update component 820 indicating the transmission of the confirmation message to the second device, e.g., from the confirmation component 840).

In some examples, the timer component 835 may identify an expiration time of the timer. Accordingly, in some examples, the timer component 835 may pass information 850 indicating the expiration time to the beam configuration update component 820, based on which the beam configuration update component 820 may identify the event for updating to the second beam configuration. In this way, the first device may communicate with the second device using the second beam configuration after the expiration time of the timer. According to the information 850, the beam configuration update component 820 may pass corresponding information 845 to the aperiodic RS reception component 815 indicating that the aperiodic RS reception component 815 is to receive one or more additional RSs. For example, the aperiodic RS reception component 815 may receive a second aperiodic RS from the second device prior to the expiration time of the timer that may have been transmitted from the second device based on not having received a confirmation message.

In some examples, the timer component 835 may identify a value for the timer based on a predetermined value for the timer or an indication of the value for the timer received from the second device (e.g., according to scheduling information 875 indicated in the signaling 870 received by the control information component 830 and passed to the timer component 835 via the beam configuration update component 820).

In some examples, the timer component 835 may reset the timer after an end of receiving the second aperiodic RS (e.g. the information 850 passed from the beam configuration update component 820 indicating reception of the second aperiodic RS at the aperiodic RS transmission component 810) or after an end of transmitting a second confirmation message in response to receiving the second aperiodic RS (e.g., the information 850 passed from the beam configuration update component 820 indicating the transmission of the second confirmation message). In some examples, the first aperiodic RS may be associated with the first set of resources and the second aperiodic RS may be associated with a second set of resources. In some examples, the first set of resources and the second set of resources may be a common set of resources. In other examples, the second set of resources may be different from the first set of resources.

The confirmation component 840 may transmit signaling 880 to the second device including a confirmation message indicating that the first aperiodic RS was received at the first device. In some examples, the confirmation message includes a channel state feedback report, an acknowledgement/negative-acknowledgement message, or a buffer status report. In some examples, the confirmation component 840 may transmit signaling 880 to the second device including a second confirmation message indicating that a second aperiodic RS was received at the first device. After an end of transmitting the signaling 880 including the confirmation message, the confirmation component 840 may pass information 855 to the beam configuration update component 820 indicating that the confirmation message was transmitted to the second device.

Figure 9:
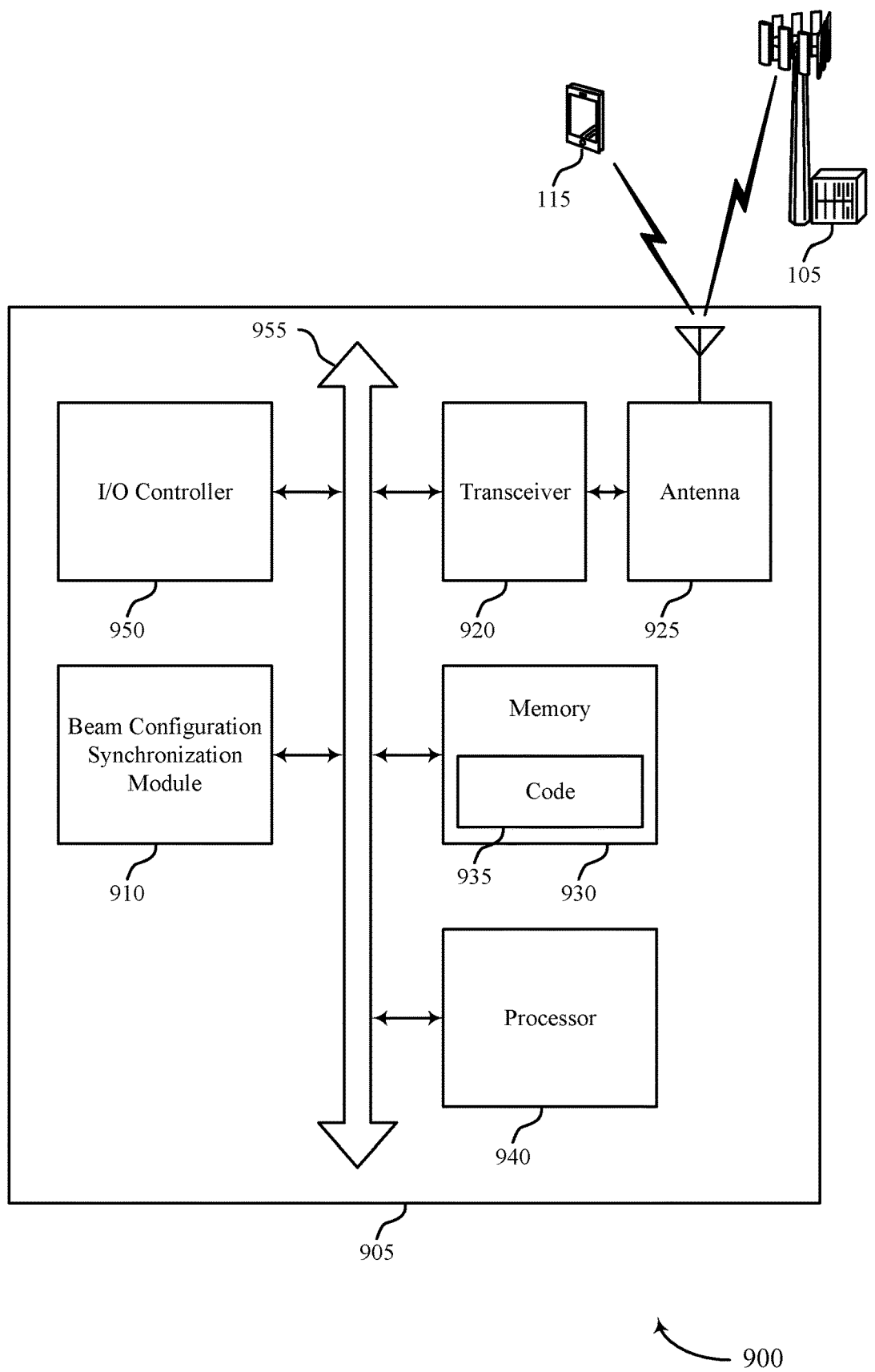
FIGS. 9 and 10 show diagrams of systems including devices that support synchronizing timing for updating beam configuration information in accordance with aspects of the present disclosure.

FIG. 9 shows a diagram of a system 900 including a device 905 that supports synchronizing timing for updating beam configuration information in accordance with aspects of the present disclosure. The device 905 may be an example of or include the components of device 605, device 705, or a UE 115 as described herein. The device 905 may include components for bi-directional voice and data communications including components for transmitting and receiving communications, including a beam configuration synchronization module 910, a transceiver 920, an antenna 925, memory 930, a processor 940, and an I/O controller 950. These components may be in electronic communication via one or more buses (e.g., bus 955).

In a first implementation, the beam configuration synchronization module 910 may transmit, from a first device to a second device configured to use a first beam configuration for communicating between the first device and the second device, a first aperiodic RS associated with a second beam configuration for communicating between the first device and the second device, monitor for at least one of an expiration of a timer associated with an update to the second beam configuration or a confirmation message from the second device indicating that the first aperiodic RS was received at the second device, and communicate with the second device according to the second beam configuration based on the monitoring.

In a second implementation, the beam configuration synchronization module 910 may also receive, at a first device configured to use a first beam configuration for communicating between the first device and a second device, a first aperiodic RS associated with a second beam configuration for communicating between the first device and the second device, identify an event for updating to the second beam configuration, and communicate with the second device according to the second beam configuration based on the identifying.

Transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM), read-only memory (ROM), or a combination thereof. The memory 930 may store computer-readable code 935 including instructions that, when executed by a processor (e.g., the processor 940) cause the device to perform various functions described herein. In some cases, the memory 930 may contain, among other things, a (Basic Input/Output System) BIOS which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting synchronizing timing for updating beam configuration information).

The I/O controller 950 may manage input and output signals for the device 905. The I/O controller 950 may also manage peripherals not integrated into the device 905. In some cases, the I/O controller 950 may represent a physical connection or port to an external peripheral. In some cases, the I/O controller 950 may utilize an operating system such as iOS®, ANDROID®, MS-DOS®, MS-WINDOWS®, OS/2®, UNIX®, LINUX®, or another known operating system. In other cases, the I/O controller 950 may represent or interact with a modem, a keyboard, a mouse, a touchscreen, or a similar device. In some cases, the I/O controller 950 may be implemented as part of a processor. In some cases, a user may interact with the device 905 via the I/O controller 950 or via hardware components controlled by the I/O controller 950.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
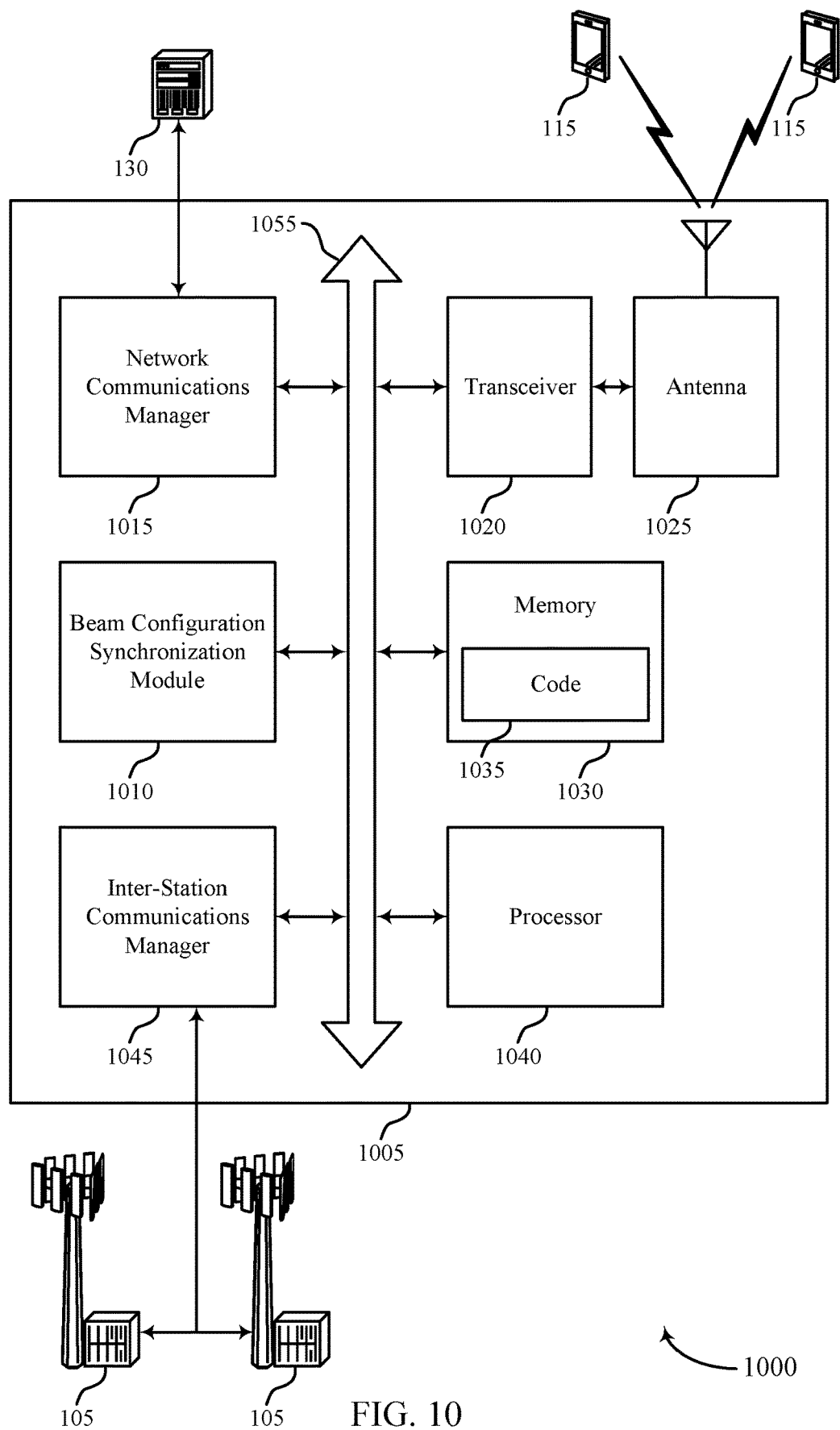

FIG. 10 shows a diagram of a system 1000 including a device 1005 that supports synchronizing timing for updating beam configuration information in accordance with aspects of the present disclosure. The device 1005 may be an example of or include the components of device 605, device 705, or a base station 105 as described herein. The device 1005 may include components for bi-directional voice and data communications including components for transmitting and receiving communications, including a beam configuration synchronization module 1010, a network communications manager 1015, a transceiver 1020, an antenna 1025, memory 1030, a processor 1040, and an inter-station communications manager 1045. These components may be in electronic communication via one or more buses (e.g., bus 1055).

In a first implementation, the beam configuration synchronization module 1010 may transmit, from a first device to a second device configured to use a first beam configuration for communicating between the first device and the second device, a first aperiodic RS associated with a second beam configuration for communicating between the first device and the second device, monitor for at least one of an expiration of a timer associated with an update to the second beam configuration or a confirmation message from the second device indicating that the first aperiodic RS was received at the second device, and communicate with the second device according to the second beam configuration based on the monitoring.

In a second implementation, the beam configuration synchronization module 1010 may also receive, at a first device configured to use a first beam configuration for communicating between the first device and a second device, a first aperiodic RS associated with a second beam configuration for communicating between the first device and the second device, identify an event for updating to the second beam configuration, and communicate with the second device according to the second beam configuration based on the identifying.

Network communications manager 1015 may manage communications with the core network (e.g., via one or more wired backhaul links). For example, the network communications manager 1015 may manage the transfer of data communications for client devices, such as one or more UEs 115.

Transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM, ROM, or a combination thereof. The memory 1030 may store computer-readable code 1035 including instructions that, when executed by a processor (e.g., the processor 1040) cause the device to perform various functions described herein. In some cases, the memory 1030 may contain, among other things, a BIOS which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting synchronizing timing for updating beam configuration information).

Inter-station communications manager 1045 may manage communications with other base station 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, inter-station communications manager 1045 may provide an X2 interface within an LTE/LTE-A wireless communications network technology to provide communication between base stations 105.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
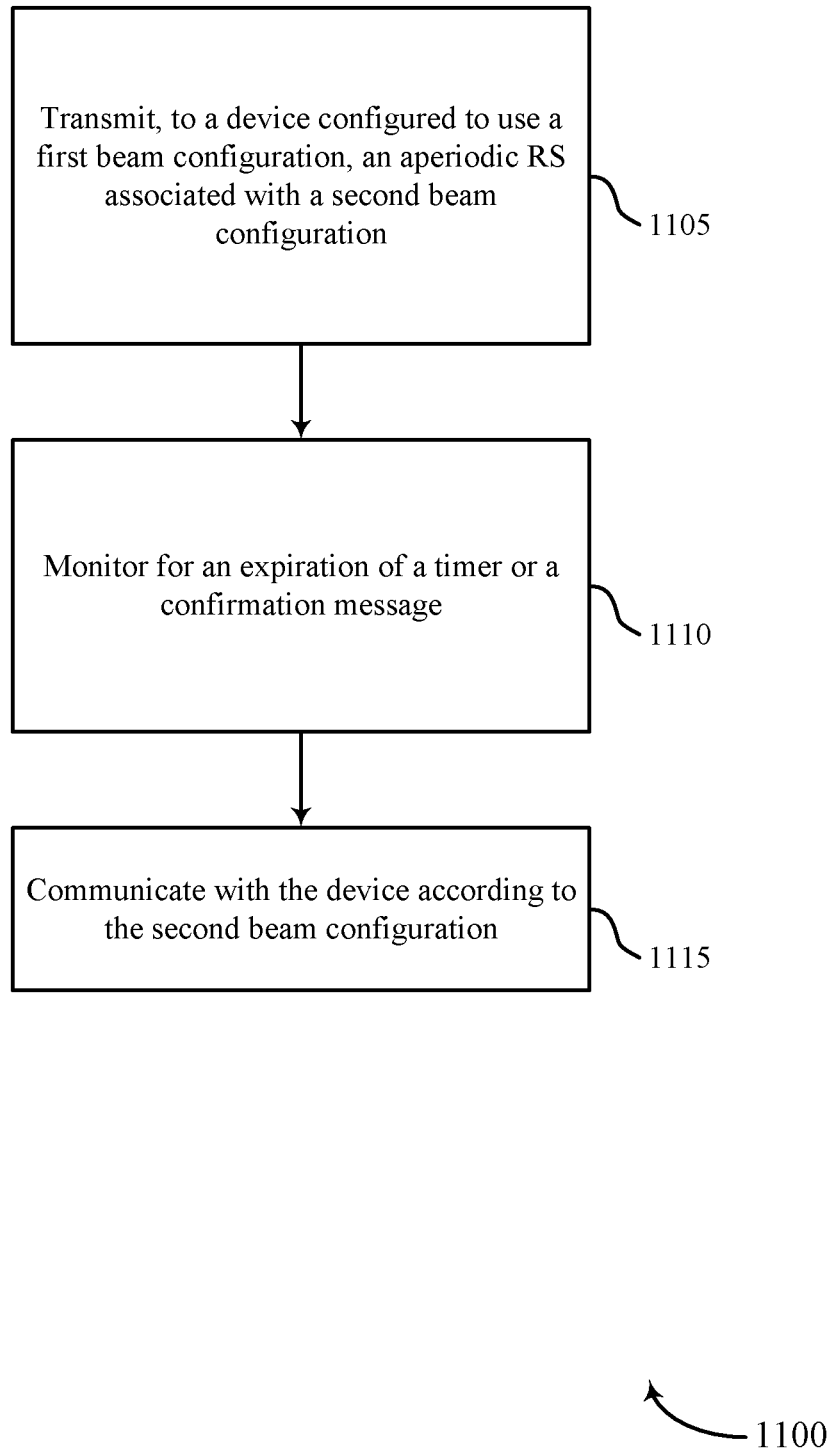
FIGS. 11 and 12 show flowcharts illustrating methods that support synchronizing timing for updating beam configuration information in accordance with aspects of the present disclosure.

FIG. 11 shows a flowchart illustrating a method 1100 that supports synchronizing timing for updating beam configuration information in accordance with aspects of the present disclosure. The operations of method 1100 may be implemented by a UE 115 or base station 105 or its components as described herein. For example, the operations of method 1100 may be performed by a beam configuration synchronization module as described with reference to FIGS. 6 through 10. In some examples, a UE or base station may execute a set of instructions to control the functional elements of the UE or base station to perform the functions described below. Additionally or alternatively, a UE or base station may perform aspects of the functions described below using special-purpose hardware.

At 1105, the UE or base station may transmit, from a first device (i.e., a first UE or base station) to a second device (e.g., a second UE or base station) configured to use a first beam configuration for communicating between the first device and the second device, a first aperiodic RS associated with a second beam configuration for communicating between the first device and the second device. For example, the first device may identify time-frequency resources for a sequence of bits that may be used to communicate the first aperiodic RS. The first device may encode and modulate the bits for communicating the first aperiodic RS over the identified time-frequency resources, and the first device may transmit the encoded and modulated bits over the time-frequency resources. The operations of 1105 may be performed according to the methods described herein. In some examples, aspects of the operations of 1105 may be performed by an aperiodic RS transmission component as described with reference to FIGS. 6 through 10.

At 1110, the first device may monitor for at least one of an expiration of a timer associated with an update to the second beam configuration or a confirmation message from the second device indicating that the first aperiodic RS was received at the second device. For example, the first device may start a timer (e.g., after an end of transmitting the first aperiodic RS) and detect an expiration an expiration of the timer. Additionally or alternatively, the first device may monitor a set of time-frequency resources over which a transmission may be received that may indicate a confirmation message corresponding to the first transmitted aperiodic RS. The operations of 1110 may be performed according to the methods described herein. In some examples, aspects of the operations of 1110 may be performed by a monitoring component as described with reference to FIGS. 6 through 10.

At 1115, the first device may communicate with the second device according to the second beam configuration based on the monitoring. For example, if the first device had started the timer at 1110, the first device may detect the expiration of the timer. Based on the expiration of the timer, the first device may switch to the second beam configuration to transmit and receive transmissions between the first device and the second device. Additionally or alternatively, the first device may receive the transmission indicating the confirmation message corresponding to the first aperiodic RS, and the first device may accordingly switch to the second beam configuration to transmit and receive transmissions between the first device and the second device. The operations of 1115 may be performed according to the methods described herein. In some examples, aspects of the operations of 1115 may be performed by a communication component as described with reference to FIGS. 6 through 10.

Figure 12:
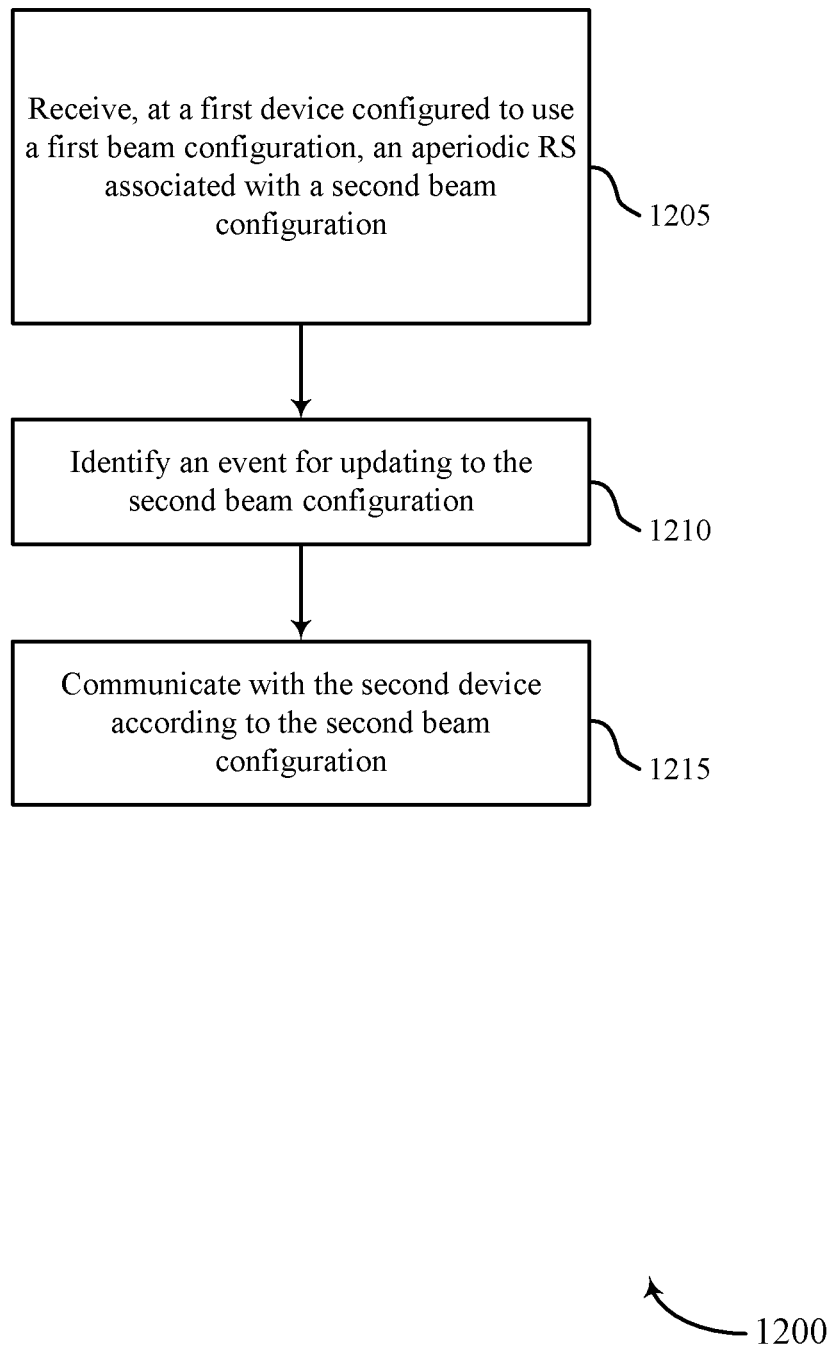

FIG. 12 shows a flowchart illustrating a method 1200 that supports synchronizing timing for updating beam configuration information in accordance with aspects of the present disclosure. The operations of method 1200 may be implemented by a UE 115 or base station 105 or its components as described herein. For example, the operations of method 1200 may be performed by a beam configuration synchronization module as described with reference to FIGS. 6 through 10. In some examples, a UE or base station may execute a set of instructions to control the functional elements of the UE or base station to perform the functions described below. Additionally or alternatively, a UE or base station may perform aspects of the functions described below using special-purpose hardware.

At 1205, a first device (e.g., a first UE or base station) configured to use a first beam configuration for communicating between the first device and a second device (e.g., a second UE or base station) may receive a first aperiodic RS associated with a second beam configuration for communicating between the first device and the second device. For example, the first device may identify time-frequency resources over which the second device may transmit the first aperiodic RS, and the first device may receive first aperiodic RS from the second device over the identified resources. The first device may receive the first aperiodic RS as a sequence of modulated and encoded bits. Accordingly, the first device may demodulate the transmission over the time-frequency resources and decode the demodulated transmission to obtain a sequence of bits indicating the associated information. The operations of 1205 may be performed according to the methods described herein. In some examples, aspects of the operations of 1205 may be performed by an aperiodic RS reception component as described with reference to FIGS. 6 through 10.

At 1210, the first device may identify an event for updating to the second beam configuration. For example, the first device may start a timer (e.g., after an end of receiving the first aperiodic RS) and detect an expiration an expiration of the timer. Additionally or alternatively, based on successfully decoding the first aperiodic RS, the first device may determine that it successfully received the first aperiodic RS, and the first device may accordingly transmit a confirmation message to the second device indicating that the first aperiodic RS was successfully received. The operations of 1210 may be performed according to the methods described herein. In some examples, aspects of the operations of 1210 may be performed by an event identifier as described with reference to FIGS. 6 through 10.

At 1215, the first device may communicate with the second device according to the second beam configuration based on the identifying. For example, if the first device had started the timer at 1110, the first device may detect the expiration of the timer. Based on the expiration of the timer, the first device may switch to the second beam configuration to transmit and receive transmissions between the first device and the second device. Additionally or alternatively, based on having transmitted the confirmation message indicating the successful reception of the first aperiodic RS, the first device may switch to the second beam configuration to transmit and receive transmissions between the first device and the second device. The operations of 1215 may be performed according to the methods described herein. In some examples, aspects of the operations of 1215 may be performed by a communication component as described with reference to FIGS. 6 through 10.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code-division multiple access (CDMA), time-division multiple access (TDMA), frequency-division multiple access (FDMA), orthogonal frequency-division multiple access (OFDMA), single-carrier frequency-division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi- Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   transmitting, from a first device to a second device configured to use a first beam configuration for communicating between the first device and the second device, a first aperiodic reference signal (RS) associated with a second beam configuration for communicating between the first device and the second device;
   monitoring for at least one of an expiration of a timer associated with an update to the second beam configuration or a confirmation message from the second device indicating that the first aperiodic RS was received at the second device;
   communicating with the second device according to the first beam configuration prior to the expiration of the timer or receiving the confirmation message; and
   communicating with the second device according to the second beam configuration based at least in part on the monitoring.

2. The method of claim 1, further comprising:
   transmitting, to the second device, a downlink control information (DCI) message comprising scheduling information associated with the first aperiodic RS.

3. The method of claim 2, wherein the scheduling information comprises a start time for a transmission opportunity for the first aperiodic RS, an end time for the transmission opportunity for the first aperiodic RS, a duration for the timer, or a combination thereof.

4. The method of claim 2, further comprising:
   starting the timer after an end of transmitting the DCI message.

5. The method of claim 1, further comprising:
   identifying an expiration time of the timer; and
   transmitting a second aperiodic RS to the second device prior to the expiration time of the timer based at least in part on failing to receive, from the second device, the confirmation message that the first aperiodic RS was received at the second device.

6. The method of claim 1, wherein the communicating with the second device according to the second beam configuration occurs after the expiration of the timer.

7. The method of claim 1, further comprising:
   receiving the confirmation message from the second device indicating that the first aperiodic RS was received at the second device; and
   starting the timer after an end of the received confirmation message.

8. The method of claim 1, further comprising:
   starting the timer after an end of transmitting the first aperiodic RS.

9. The method of claim 1, wherein the first beam configuration comprises first spatial relation information associated with a first uplink transmit beam at the first device or the second device and a first uplink receive beam at the second device or the first device.

10. The method of claim 9, wherein the second beam configuration comprises second spatial relation information associated with a second uplink transmit beam at the first device or the second device and a second uplink receive beam at the second device or the first device.

11. The method of claim 10, wherein the first and second uplink transmit beams are associated with a common set of beam parameters.

12. The method of claim 1, wherein the first beam configuration comprises first quasi-colocated (QCL) information associated with a first downlink transmit beam at the first device or the second device and a first downlink receive beam at the second device or the first device.

13. The method of claim 12, wherein the second beam configuration comprises second quasi-colocated (QCL) information associated with a second downlink transmit beam at the first device or the second device and a second downlink receive beam at the second device or the first device.

14. The method of claim 13, wherein the first and second downlink transmit beams are associated with a common set of beam parameters.

15. The method of claim 1, further comprising:
   identifying a value for the timer based at least in part on a predetermined value for the timer or an indication of the value for the timer received from the second device.

16. The method of claim 1, wherein the confirmation message comprises a channel state feedback report, an acknowledgement/negative-acknowledgement message, or a buffer status report.

17. The method of claim 1, wherein the first aperiodic RS comprises an aperiodic channel state information reference signal or a sounding reference signal.

18. A method for wireless communications, comprising:
   receiving, at a first device configured to use a first beam configuration for communicating between the first device and a second device, a first aperiodic reference signal (RS) associated with a second beam configuration for communicating between the first device and the second device;
   starting a timer after an end of receiving the first aperiodic RS or after an end of transmitting a confirmation message in response to receiving the first aperiodic RS;
   identifying an event for updating to the second beam configuration; and
   communicating with the second device according to the second beam configuration based at least in part on the identifying.

19. The method of claim 18, further comprising:
   transmitting, to the second device, a downlink control information (DCI) message comprising scheduling information associated with the first aperiodic RS.

20. The method of claim 19, wherein the scheduling information comprises a start time for a transmission opportunity for the first aperiodic RS, an end time for the transmission opportunity for the first aperiodic RS, a duration for the timer, or a combination thereof.

21. The method of claim 18, wherein identifying the event for updating to the second beam configuration comprises:
  identifying an expiration of the timer, wherein the communicating with the second device according to the second beam configuration occurs after the expiration of the timer.

22. The method of claim 18, further comprising:
  identifying a value for the timer based at least in part on a predetermined value for the timer or an indication of the value for the timer received from the second device.

23. The method of claim 18, wherein identifying the event for updating to the second beam configuration comprises:
  receiving, prior to the expiration time of the timer, control information from the second device scheduling a second aperiodic RS; and
  resetting the timer after an end of receiving the second aperiodic RS or after an end of transmitting a second confirmation message in response to receiving the second aperiodic RS.

24. The method of claim 23, wherein the first aperiodic RS is associated with a first set of resources and the second aperiodic RS is associated with a second set of resources.

25. The method of claim 24, wherein the first set of resources and the second set of resources are a common set of resources.

26. The method of claim 24, wherein the second set of resources is different from the first set of resources.

27. The method of claim 24, wherein the first set of resources comprises an uplink control channel, an uplink data channel, a downlink control channel, a downlink data channel, a bandwidth part, a sub-band, a set of time-resources, or a combination thereof.

28. The method of claim 18, further comprising:
  communicating with the second device according to the first beam configuration prior to the event for updating to the second beam configuration.

29. The method of claim 18, wherein identifying the event for updating to the second beam configuration comprises:
  transmitting a confirmation message to the second device indicating that the first aperiodic RS was received at the first device.

30. The method of claim 29, wherein identifying the event for updating to the second beam configuration comprises:
  starting a timer after an end of transmitting the confirmation message; and
  identifying an expiration of the timer.

31. The method of claim 29, wherein the confirmation message comprises a channel state feedback report, an acknowledgement/negative-acknowledgement message, or a buffer status report.

32. The method of claim 18, wherein:
  the first beam configuration comprises first spatial relation information associated with a first uplink transmit beam at the second device or the first device and a first uplink receive beam at the first device or the second device; and
  the second beam configuration comprises second spatial relation information associated with a second uplink transmit beam at the second device or the first device and a second uplink receive beam at the first device or the second device.

33. The method of claim 18, wherein:
  the first beam configuration comprises first quasi-colocated (QCL) information associated with a first downlink transmit beam at the second device or the first device and a first downlink receive beam at the first device or the second device; and
  the second beam configuration comprises second QCL information associated with a second downlink transmit beam at the second device or the first device and a second downlink receive beam at the first device or the second device.

34. The method of claim 18, wherein the first aperiodic RS comprises an aperiodic channel state information reference signal or a sounding reference signal.

35. An apparatus for wireless communications, comprising:
  a processor;
  memory in electronic communication with the processor; and
  instructions stored in the memory and executable by the processor to cause the apparatus to:
    transmit, from a first device to a second device configured to use a first beam configuration for communicating between the first device and the second device, a first aperiodic reference signal (RS) associated with a second beam configuration for communicating between the first device and the second device;
    monitor for at least one of an expiration of a timer associated with an update to the second beam configuration or a confirmation message from the second device indicating that the first aperiodic RS was received at the second device;
    communicate with the second device according to the first beam configuration prior to the expiration of the timer or receiving the confirmation message; and
    communicate with the second device according to the second beam configuration based at least in part on the monitoring.

36. The apparatus of claim 35, wherein the instructions are further executable by the processor to cause the apparatus to:
  transmit, to the second device, a downlink control information (DCI) message comprising scheduling information associated with the first aperiodic RS.

37. The apparatus of claim 35, wherein the instructions are further executable by the processor to cause the apparatus to:
  identify an expiration time of the timer; and
  transmit a second aperiodic RS to the second device prior to the expiration time of the timer based at least in part on failing to receive, from the second device, the confirmation message that the first aperiodic RS was received at the second device.

38. The apparatus of claim 35, wherein the communicating with the second device according to the second beam configuration occurs after the expiration of the timer.

39. The apparatus of claim 35, wherein the instructions are further executable by the processor to cause the apparatus to:
  receive the confirmation message from the second device indicating that the first aperiodic RS was received at the second device; and
  start the timer after an end of receiving the confirmation message.

40. The apparatus of claim 35, wherein the instructions are further executable by the processor to cause the apparatus to:
  start the timer after an end of transmitting the first aperiodic RS.

41. The apparatus of claim 35, wherein the first beam configuration comprises first spatial relation information associated with a first uplink transmit beam at the first device or the second device and a first uplink receive beam at the second device or the first device.

42. The apparatus of claim 35, wherein the first beam configuration comprises first quasi-colocated (QCL) information associated with a first downlink transmit beam at the first device or the second device and a first downlink receive beam at the second device or the first device.

43. The apparatus of claim 35, wherein the instructions are further executable by the processor to cause the apparatus to:
identify a value for the timer based at least in part on a predetermined value for the timer or an indication of the value for the timer received from the second device.

44. The apparatus of claim 35, wherein the confirmation message comprises a channel state feedback report, an acknowledgement/negative-acknowledgement message, or a buffer status report.

45. The apparatus of claim 35, wherein the first aperiodic RS comprises an aperiodic channel state information reference signal or a sounding reference signal.

46. An apparatus for wireless communications, comprising:
a processor;
memory in electronic communication with the processor; and
instructions stored in the memory and executable by the processor to cause the apparatus to:
receive, at a first device configured to use a first beam configuration for communicating between the first device and a second device, a first aperiodic reference signal (RS) associated with a second beam configuration for communicating between the first device and the second device;
start a timer after an end of receiving the first aperiodic RS or after an end of transmitting a confirmation message in response to receiving the first aperiodic RS;
identify an event for updating to the second beam configuration; and
communicate with the second device according to the second beam configuration based at least in part on the identifying.

47. The apparatus of claim 46, wherein the instructions are further executable by the processor to cause the apparatus to:
identify a value for the timer based at least in part on a predetermined value for the timer or an indication of the value for the timer received from the second device.

48. The apparatus of claim 46, wherein the instructions to identify the event for updating to the second beam configuration are executable by the processor to cause the apparatus to:
receive, prior to the expiration time of the timer, control information from the second device scheduling a second aperiodic RS; and
reset the timer after an end of receiving the second aperiodic RS or after an end of transmitting a second confirmation message in response to receiving the second aperiodic RS.

49. The apparatus of claim 46, wherein the instructions are further executable by the processor to cause the apparatus to:
communicate with the second device according to the first beam configuration prior to the event for updating to the second beam configuration.

50. The apparatus of claim 46, wherein the instructions to identify the event for updating to the second beam configuration are executable by the processor to cause the apparatus to:
transmit a confirmation message to the second device indicating that the first aperiodic RS was received at the first device.

51. The apparatus of claim 46, wherein the instructions are further executable by the processor to cause the apparatus to:
transmit, to the second device, a downlink control information (DCI) message comprising scheduling information associated with the first aperiodic RS.

52. The apparatus of claim 46, wherein:
the first beam configuration comprises first spatial relation information associated with a first uplink transmit beam at the second device or the first device and a first uplink receive beam at the first device or the second device; and
the second beam configuration comprises second spatial relation information associated with a second uplink transmit beam at the second device or the first device and a second uplink receive beam at the first device or the second device.

53. The apparatus of claim 46, wherein:
the first beam configuration comprises first quasi-colocated (QCL) information associated with a first downlink transmit beam at the second device or the first device and a first downlink receive beam at the first device or the second device; and
the second beam configuration comprises second QCL information associated with a second downlink transmit beam at the second device or the first device and a second downlink receive beam at the first device or the second device.

54. The apparatus of claim 46, wherein the first aperiodic RS comprises an aperiodic channel state information reference signal or a sounding reference signal.

55. An apparatus for wireless communications, comprising:
means for transmitting, from a first device to a second device configured to use a first beam configuration for communicating between the first device and the second device, a first aperiodic reference signal (RS) associated with a second beam configuration for communicating between the first device and the second device;
means for monitoring for at least one of an expiration of a timer associated with an update to the second beam configuration or a confirmation message from the second device indicating that the first aperiodic RS was received at the second device;
means for communicating with the second device according to the first beam configuration prior to the expiration of the timer or receiving the confirmation message; and
means for communicating with the second device according to the second beam configuration based at least in part on the monitoring.

56. An apparatus for wireless communications, comprising:
means for receiving, at a first device configured to use a first beam configuration for communicating between the first device and a second device, a first aperiodic reference signal (RS) associated with a second beam configuration for communicating between the first device and the second device;

means for starting a timer after an end of receiving the first aperiodic RS or after an end of transmitting a confirmation message in response to receiving the first aperiodic RS;

means for identifying an event for updating to the second beam configuration; and means for communicating with the second device according to the second beam configuration based at least in part on the identifying.

57. A non-transitory computer-readable medium storing code for wireless communications, the code comprising instructions executable by a processor to:

transmit, from a first device to a second device configured to use a first beam configuration for communicating between the first device and the second device, a first aperiodic reference signal (RS) associated with a second beam configuration for communicating between the first device and the second device;

monitor for at least one of an expiration of a timer associated with an update to the second beam configuration or a confirmation message from the second device indicating that the first aperiodic RS was received at the second device;

communicate with the second device according to the first beam configuration prior to the expiration of the timer or receiving the confirmation message; and communicate with the second device according to the second beam configuration based at least in part on the monitoring.

58. A non-transitory computer-readable medium storing code for wireless communications, the code comprising instructions executable by a processor to:

receive, at a first device configured to use a first beam configuration for communicating between the first device and a second device, a first aperiodic reference signal (RS) associated with a second beam configuration for communicating between the first device and the second device;

start a timer after an end of receiving the first aperiodic RS or after an end of transmitting a confirmation message in response to receiving the first aperiodic RS;

identify an event for updating to the second beam configuration; and communicate with the second device according to the second beam configuration based at least in part on the identifying.

* * * * *